United States Patent
Bach

(10) Patent No.: US 9,846,314 B2
(45) Date of Patent: Dec. 19, 2017

(54) OPTICAL SYSTEM FOR IMAGING AN OBJECT AND METHOD FOR THE OPTICAL SYSTEM

(71) Applicant: Carl Zeiss Sports Optics GmbH, Wetzlar (DE)

(72) Inventor: Christian Bach, Buseck (DE)

(73) Assignee: Carl Zeiss Sports Optics GmbH, Wetzlar (DE)

( * ) Notice: Subject to any disclaimer, the term of this patent is extended or adjusted under 35 U.S.C. 154(b) by 92 days.

(21) Appl. No.: 14/372,147

(22) PCT Filed: Jan. 9, 2013

(86) PCT No.: PCT/EP2013/050280
§ 371 (c)(1),
(2) Date: Jul. 14, 2014

(87) PCT Pub. No.: WO2013/104655
PCT Pub. Date: Jul. 18, 2013

(65) Prior Publication Data
US 2015/0002938 A1  Jan. 1, 2015

Related U.S. Application Data

(60) Provisional application No. 61/586,305, filed on Jan. 13, 2012.

(30) Foreign Application Priority Data

Jan. 13, 2012 (DE) .................... 10 2012 200 514

(51) Int. Cl.
*G02B 27/64* (2006.01)
*G02B 23/18* (2006.01)

(52) U.S. Cl.
CPC ............ *G02B 27/64* (2013.01); *G02B 23/18* (2013.01); *G02B 27/646* (2013.01)

(58) Field of Classification Search
CPC .... G02B 27/64; G02B 27/642; G02B 27/646; G02B 21/20
(Continued)

(56) References Cited

U.S. PATENT DOCUMENTS

| 4,465,346 A | 8/1984 | Fraser |
| 5,672,862 A * | 9/1997 | Ohara ................. G02B 27/646 250/204 |

(Continued)

FOREIGN PATENT DOCUMENTS

| DE | 23 53 101 C3 | 5/1974 |
| DE | 39 33 255 C2 | 5/1991 |

(Continued)

OTHER PUBLICATIONS

STIC search, Jul. 26, 2017.*

*Primary Examiner* — Stephone B Allen
*Assistant Examiner* — Travis Fissel
(74) *Attorney, Agent, or Firm* — Muirhead and Saturnelli, LLC

(57) ABSTRACT

A method for adjusting a position of a first image stabilization unit and/or a second image stabilization unit of an optical system is provided. The method comprises the steps of detecting a movement of the optical system by means of an angle-of-rotation sensor and determining a bending angle of a first hinge part relative to a second hinge part of a folding bridge of the optical system. Furthermore, a correction angle is determined based on the bending angle. The first image stabilization unit is rotated about the correction (Continued)

angle relative to a first housing and/or the second image stabilization unit is rotated about the correction angle relative to a second housing.

23 Claims, 8 Drawing Sheets

(58) Field of Classification Search
USPC .......... 359/544–557; 382/276, 293; 356/138; 348/208.7, 208.8, 208.9
See application file for complete search history.

(56) References Cited

U.S. PATENT DOCUMENTS

| | | | |
|---|---|---|---|
| 5,910,859 | A | 6/1999 | Takahashi et al. |
| 6,078,436 | A | 6/2000 | Hirunuma et al. |
| 6,128,442 | A | 10/2000 | Enomoto |
| 6,392,799 | B1 * | 5/2002 | Baun ................. G02B 23/00 359/429 |
| 6,414,793 | B1 | 7/2002 | Ishijima et al. |
| 6,545,806 | B2 * | 4/2003 | Notagashira ......... G02B 27/646 359/407 |
| 6,728,030 | B2 * | 4/2004 | Bellefuil .............. G02B 23/18 359/407 |
| 7,088,512 | B2 * | 8/2006 | Haga .................. G02B 27/646 359/554 |
| 7,460,154 | B2 | 12/2008 | Kawahara |
| 2002/0034004 | A1 * | 3/2002 | Khoshnevis ........... G02B 23/18 359/407 |
| 2003/0231393 | A1 * | 12/2003 | Yamamoto ........... G02B 27/646 359/557 |
| 2004/0136068 | A1 | 7/2004 | Haga |
| 2006/0228097 | A1 | 10/2006 | Higurashi |
| 2007/0019294 | A1 | 1/2007 | Baumann et al. |
| 2007/0053056 | A1 * | 3/2007 | Charlesworth .......... G02B 7/12 359/367 |
| 2008/0226196 | A1 * | 9/2008 | Kojima ................ G06K 9/3275 382/289 |
| 2009/0040612 | A1 * | 2/2009 | Ota ..................... G02B 27/646 359/554 |
| 2010/0091037 | A1 * | 4/2010 | Banerjee .............. H04N 1/3877 345/649 |
| 2010/0098394 | A1 * | 4/2010 | Ishihara .............. G02B 27/646 396/55 |
| 2011/0150441 | A1 * | 6/2011 | Ollila .................... G02B 7/08 396/55 |

FOREIGN PATENT DOCUMENTS

| | | |
|---|---|---|
| DE | 198 18 467 A1 | 10/1998 |
| DE | 199 37 775 A1 | 2/2000 |
| DE | 694 26 246 T2 | 3/2001 |
| DE | 10 2004 001 349 A1 | 7/2004 |
| DE | 10 2005 027 870 A1 | 12/2006 |
| EP | 0 636 916 B1 | 11/2000 |
| EP | 1 708 019 A2 | 10/2006 |
| GB | 2474886 A * | 5/2011 ......... H04N 5/23248 |

* cited by examiner

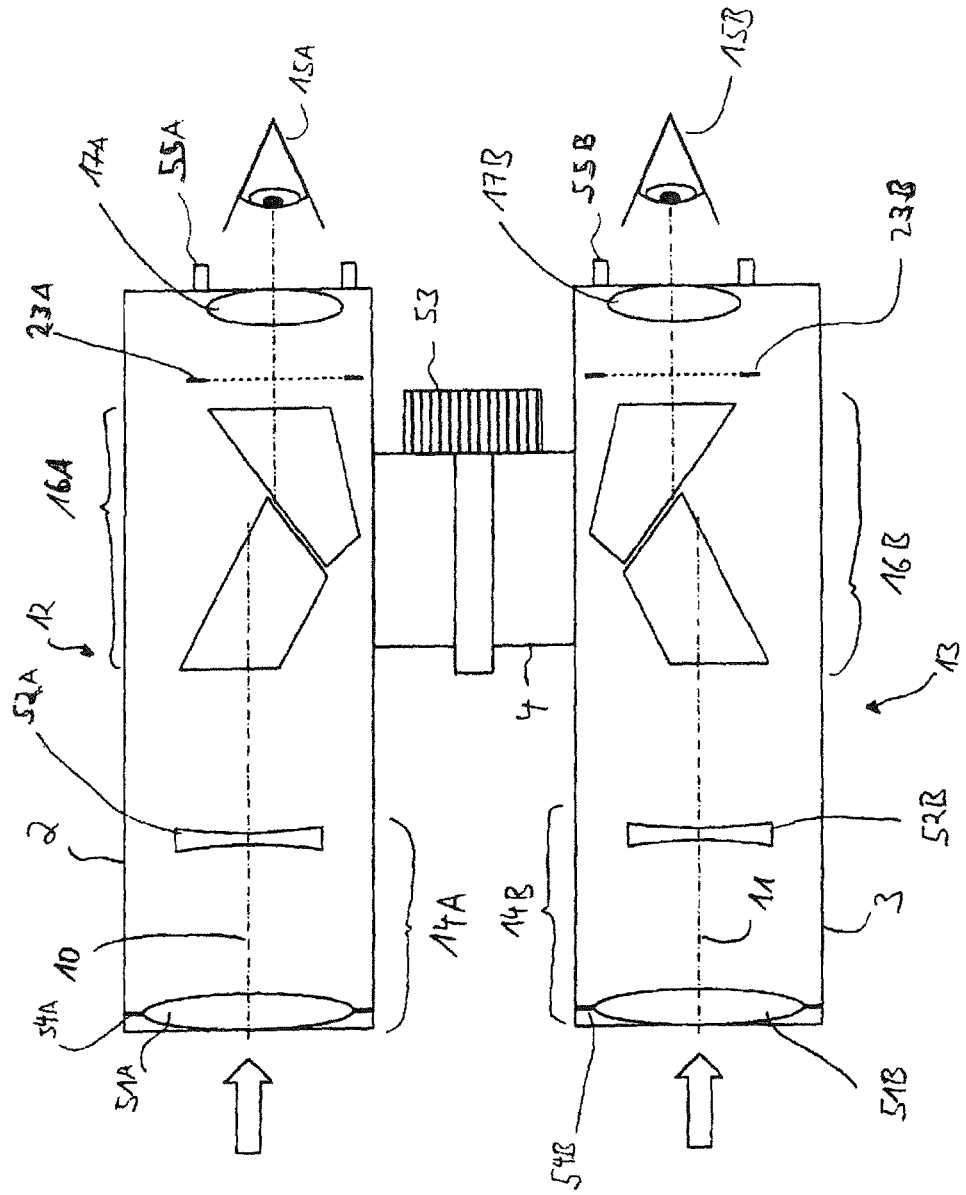
Fig. 1B

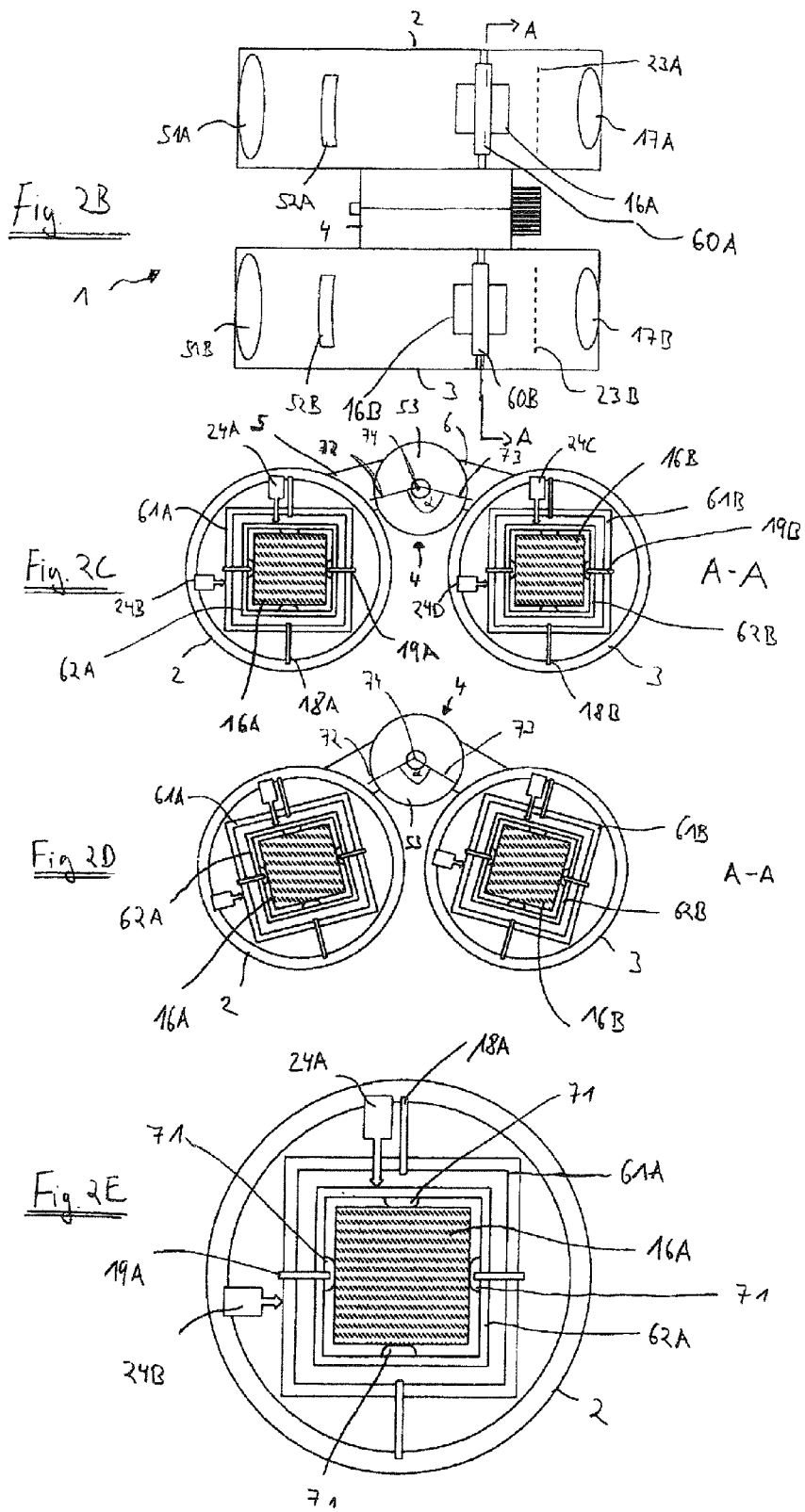

OPTICAL SYSTEM FOR IMAGING AN OBJECT AND METHOD FOR THE OPTICAL SYSTEM

RELATED APPLICATIONS

This application claims priority to U.S. Provisional App. 61/586,305 filed Jan. 13, 2012, which is incorporated herein by reference.

TECHNICAL FIELD

This application relates to an optical system for imaging an object, the optical system having an objective, an image stabilizing unit and an image plane. By way of example, the optical system is provided with an eyepiece in one exemplary embodiment. This application furthermore relates to a method for the optical system.

BACKGROUND OF THE INVENTION

The prior art has disclosed binocular field glasses comprising a first housing part and a second housing part. A first optical subsystem for a first eye of a user is arranged in the first housing part. A second optical subsystem for a second eye of a user is arranged in the second housing part. The first housing part and the second housing part are connected to one another by means of a folding bridge. The folding bridge has a first hinge part arranged on the first housing part. The folding bridge furthermore has a second hinge part arranged on the second housing part. The folding bridge renders it possible to set an intraocular distance such that the first housing part and the second housing part are arranged relative to one another such that the first housing part is arranged in front of one of the two eyes of the user and that the second housing part is arranged in front of the other one of the two eyes of the user.

In the text above, and also in the text below, an optical system is understood to mean not only binocular field glasses but rather any optical system, i.e., for example, also a monocular optical system, particularly in the form of a telescope.

The image captured by an observer through the telescope or the field glasses is often perceived to be shaking because trembling movements or rotational movements of the hands of the user, and also movements underfoot, in turn cause movements of the optical system. In order to avoid this, it is known to stabilize images in an optical system. Known solutions use stabilizing apparatuses for stabilizing the image by means of a mechanical apparatus and/or an electronic apparatus.

DE 23 53 101 C3 has disclosed an optical system in the form of a telescope, which has an objective, an image stabilizing unit in the form of a prism erecting system and an eyepiece. The prism erecting system is mounted in cardan-joint fashion in a housing of the telescope. This is understood to mean that the prism erecting system is arranged in the housing of the telescope such that the prism erecting system is mounted such that it can rotate about two axes arranged at right angles to one another. For the rotatable mounting, use is generally made of a device which is referred to as a cardan-type mount. A hinge point of the prism erecting system, mounted in a cardan-joint fashion in the housing, is arranged centrally between an image-side main plane of the objective and an object-side main plane of the eyepiece. The prism erecting system, mounted in a cardan-joint fashion, is not moved by occurring rotational-trembling movements as a result of its inertia. It therefore remains fixed in space. This is how an image deterioration which occurs as a result of the rotational-trembling movement of the housing is compensated for.

DE 39 33 255 C2 discloses binocular field glasses with an image stabilization having a prism erecting system. The prism erecting system has Porro prisms, which respectively have one tilt axis. The Porro prisms are designed such that they can pivot about their respective tilt axis. Motors are provided for pivoting the Porro prisms. The pivoting is brought about dependent on a trembling movement which causes a shaking of an observed image.

A further optical system with an image stabilizing unit is known from U.S. Pat. No. 5,910,859. The image stabilizing unit of this optical system is designed in the form of an erecting system, which is arranged at an optically neutral point centrally between an objective and an eyepiece. An optically neutral point is understood to mean a point about which the objective and the eyepiece can be rotated in relative fashion in space without the position of an image of an object being displaced, with the erecting system remaining fixed in space. The erecting system is moveably arranged about the optically neutral point and about two axes which are arranged perpendicular to the optical axis. If the erecting system is now kept stably in space, even in the case of a trembling movement, then the image of an object is also stabilized by means of this known optical system when the object is observed. The optically neutral point can also be described as follows: an optically neutral point is understood to mean a point on an optical axis between an objective and an eyepiece about which an image stabilizing unit is rotatably arranged such that in the case of a rotational-trembling movement about any point the direction of the image of an object observed through the objective and the eyepiece remains fixed in space, just like the image stabilizing unit.

The prior art has also disclosed field glasses which have a rigid housing, in which a first optical subsystem and a second optical subsystem are arranged for both eyes of a user. In order to stabilize an image on account of the problem already mentioned above, a single image stabilizing unit is arranged in the housing, said stabilizing unit being used for image stabilization both in respect of the first optical subsystem and in respect of the second optical subsystem. As a result of the design, this single image stabilizing unit is at least as wide as the distance of the first optical subsystem from the second optical subsystem. In the known field glasses provision is made for the possibility of setting the interocular distance of a user. To this end, rotatable rhombic prisms are arranged in the rigid housing, the former being installed between the rigid housing and an eyepiece. If the rhombic prisms are rotated, there is a change in the spacing of the eyepieces so that the interocular distance of a user can be set.

Now, rotational-angle detectors are used in the above-described known field glasses in order to establish a trembling movement or a further movement of the field glasses. By means of these rotational-angle detectors it is possible to measure rotational-trembling movements about two axes which are aligned perpendicular to the optical axis of the field glasses. The two axes (namely a first measurement axis and a second measurement axis) are likewise aligned perpendicular to one another. For image stabilization purposes, the known field glasses are now provided with a control device, which is arranged in the rigid housing and adjusts the image stabilizing unit for image stabilization purposes. In the process, the image stabilizing unit is moved along the optical axis. Furthermore, provision is made for the image stabilizing unit to be rotated about a first axis of rotation and about a second axis of rotation, wherein the first axis of rotation and the second axis of rotation are aligned perpendicular to the optical axis. However, in order to determine the rotational angle precisely about which the image stabilizing unit is to be rotated about the first axis of rotation and the second axis of rotation, it is necessary to take into account the relative position of the first measurement axis and the second measurement axis of a rotational-angle detector with respect to the first axis of rotation and the second axis of rotation of the image stabilizing unit. In the field glasses with a rigid housing known from the prior art, it is possible to design the relative position of the first axis of rotation and the second axis of rotation as well as of the first measurement axis and the second measurement axis such that the two pairs of axes coincide. The rotational angle can then be determined easily.

Accordingly, it would be desirable to specify a method for setting a position of an image stabilizing unit which is arranged in an optical system that has a folding bridge. Moreover, it would be desirable to specify an optical system which is suitable for carrying out this method.

SUMMARY OF THE INVENTION

According to the system described herein, a method (first method) is provided for setting a position of a first image stabilizing unit and/or a second image stabilizing unit of an optical system. The first image stabilizing unit is arranged in a first housing. The second image stabilizing unit is arranged in a second housing. The first housing is connected to the second housing by means of at least one folding bridge. The folding bridge has a first hinge part arranged at the first housing. The folding bridge furthermore has a second hinge part arranged at the second housing. By way of example, the optical system is embodied as binocular field glasses or as a monocular telescope. However, the system described herein is suitable for any optical system. In the method according to the system described herein, provision is now made for a movement of the optical system to be detected by means of at least one rotational-angle detector. By way of example, the movement is a trembling movement of the optical system, caused by the trembling of hands of a user. In addition to detecting the movement, a folding angle of the first hinge part with respect to the second hinge part is determined. A correction angle is thereupon determined on the basis of the folding angle. There is a rotation of the first image stabilizing unit about the correction angle relative to the first housing. Additionally, or as an alternative thereto, provision is made for the second image stabilizing unit to be rotated about the correction angle relative to the second housing. As an alternative to this, provision is made for a first correction angle and a second correction angle to be determined, wherein the first image stabilizing unit is rotated about the first correction angle relative to the first housing and wherein the second image stabilizing unit is rotated about the second correction angle relative to the second housing.

The folding angle is an angle which emerges as a result of adjusting a first relative position of the first housing with respect to the second housing to a second relative position of the first housing with respect to the second housing. The method according to the system described herein is based on the discovery that the determination of the folding angle between the first hinge part and the second hinge part and a determination of a correction angle which took place as a result of this renders it possible to take account of the relative position of the rotational-angle detector, which for example is arranged in the first housing, and the second image stabilizing unit, which is arranged in the second housing, and accordingly renders it possible to set the first image stabilizing unit and the second image stabilizing unit correctly for image stabilization purposes. Here, the correction angle can correspond to the folding angle. As an alternative thereto, provision is made for the correction angle to correspond to a sum of the folding angle and an offset angle, with the offset angle for example emerging as a result of the fact that axes of rotation of the image stabilizing unit(s) are not arranged perpendicular to an optical axis or that, as a result of the design, errors occur when adjusting the image stabilizing units in the respective housing.

In one embodiment of the method according to the invention, provision is additionally or alternatively made for the rotational-angle detector to have a first measurement axis and a second measurement axis. The second measurement axis is aligned perpendicular to the first measurement axis. The first measurement axis and the second measurement axis form a first coordinate system. Furthermore, provision is made for correction coordinates to be determined using the correction angle by means of a transformation of rotational coordinates, based on the first coordinate system and measured by the rotational-angle detector. The correction coordinates are based on a second coordinate system, which is provided by a third axis of rotation and a fourth axis of rotation of the second image stabilizing unit.

In a further exemplary embodiment of the method according to the invention, provision is additionally or alternatively made for the correction coordinates to be determined as follows:

$$b_x = a_x \cdot \cos(\alpha_k) + a_y \cdot \sin(\alpha_k), \qquad \text{Equation 1}$$

$$b_y = a_x \cdot \sin(\alpha_k) - a_y \cdot \cos(\alpha_k), \qquad \text{Equation 2}$$

wherein:
$a_x$ is a signal of the rotational-angle detector in respect of the first measurement axis,
$a_y$ is a signal of the rotational-angle detector in respect of the second measurement axis,
$b_x$ is a first transformed signal for a rotation in respect of the third axis of rotation,
$b_y$ is a second transformed signal for a rotation in respect of the fourth axis of rotation, and wherein
$\alpha_k$ is the folding angle.

In principle, this is a transformation of the coordinates of the first measurement axis and the second measurement axis into the coordinates of the third axis of rotation and the fourth axis of rotation of the second image stabilizing unit. If the rotational-angle detector is arranged in the first housing, in which the first image stabilizing unit is also arranged, there is no need for such a transformation in respect of the first image stabilizing unit. In this case, the relative position of the two measurement axes of the rotational-angle detector and the two axes of rotation (a first axis of rotation and a second axis of rotation) of the first image stabilizing unit is known. By way of example, they coincide.

In a further exemplary embodiment of the method according to the invention, provision is additionally or alternatively made for the movement of the optical system to be determined by a predetermined number n of rotational-angle detectors, wherein n is a natural number. By way of example, each of the n rotational-angle detectors is arranged in the first housing. Additionally, or as an alternative thereto, provision is made for the movement of the optical system to be determined by determining a rotation of the optical system with respect to respectively the first measurement axis and with respect to respectively the second measurement axis of each of the n rotational-angle detectors. Furthermore, a first mean value of the rotations about the first measurement axes and a second mean value of the rotations about the second measurement axes are determined.

In yet a further exemplary embodiment of the method according to the invention, provision is made for a measurement signal (detector signal) from the rotational-angle detector to be processed by means of a low-pass filter or by means of a high-pass filter. When using n rotational-angle detectors, a measurement signal from each of the n rotational-angle detectors is processed by means of a low-pass filter. Alternatively, provision is made for a measurement signal from each of the n rotational-angle detectors to be processed by means of a high-pass filter.

The use of n rotational-angle detectors and the above-described determination of the mean values are based on the following deliberation: rotational-angle detectors are subject to a specific accuracy. A rotational-angle detector which has a relatively small design and can be produced in a cost-effective fashion is suitable for the purposes of optical systems. By way of example, use is made of a rotational-angle detector which operates on the basis of MEMS (micro electrical mechanical systems) technology. However, this rotational-angle detector has a noise component which by all means has an influence on the stabilizing quality. This is undesirable. In order to reduce such noise, it is possible to reduce the bandwidth of the measurement signal of the rotational-angle detector. This means that measurement signals and also the noise, caused by the design, are suppressed outside of this bandwidth (frequency range). By way of example, this is brought about by processing the measurement signal from the rotational-angle detector by means of a high-pass filter and/or a low-pass filter. Hence, noise with frequencies above and below the frequency range no longer occurs. Surprisingly, deliberations have now shown that the use of the aforementioned noise suppression is by all means advantageous because movements, more particularly trembling movements, which are created by trembling of a user, are only visible in the image up to a frequency of approximately 20 Hz. Movements which have a movement frequency above 20 Hz only lead to unsharpness in the image because these lie above a frequency which can be identified as movement by the human eye. In the case of movements below a frequency of 0.5 Hz, there are only relatively few involuntary trembling movements but increasingly the voluntary movement of the user.

Furthermore, the deliberations surprisingly show that although it is possible to reduce the overall amplitude of the noise by the above-described procedure, the component of the noise in the utilized frequency range continues to exist and is visible to the user. This noise is thermal noise and is respectively individual to each rotational-angle detector. The deliberations have now shown that the noise in the utilized frequency range can be reduced by virtue of the fact that a plurality of rotational-angle detectors are used, for example 4 to 8 rotational-angle detectors, instead of a single rotational-angle detector. The number of rotational-angle detectors is not restricted to the aforementioned number; rather, any suitable number of rotational-angle detectors can be selected. By way of example, provision is made for the plurality of rotational-angle detectors to be arranged in a single housing (i.e. in the first housing or in the second housing). The measurement signals of the plurality of rotational-angle detectors are summed and multiplied by the inverse of the number of rotational-angle detectors (or expressed differently: divided by the number of rotational-angle detectors). As a result, the signal-to-noise ratio reduces along with the square root of n, wherein n is the number of rotational-angle detectors. In the process, the deliberations have likewise shown that the reduction in noise in the case of different whole numbers n emerges as follows:

n=1: noise=1
n=2: noise=0.7
n=3: noise=0.57
n=4: noise=0.5
n=9: noise=0.3
n=16: noise=0.25.

If the number of rotational-angle detectors exceeds four, only a relatively small reduction in the noise is possible. The aforementioned values according to the thought-through deliberation show that the noise can already be reduced to 70% if two rotational-angle detectors are used. If 3 rotational-angle detectors are used, the noise can already be reduced to almost 50%. This is generally sufficient. However, if greater accuracy is required, it is also possible to use a greater number of rotational-angle detectors.

An optical system according to the system described herein for imaging an object, which optical system is more particularly provided for carrying out a method with one of the aforementioned features, or a combination of two of the aforementioned features, is provided. By way of example, the optical system is designed as binocular field glasses or a monocular telescope. However, as already mentioned above, the system described herein is not restricted to such optical systems.

The optical system according to the system described herein has at least one first housing and at least one second housing. The first housing is connected to the second housing by means of at least one folding bridge. The folding bridge has a first hinge part arranged at the first housing. The folding bridge furthermore has a second hinge part arranged at the second housing. Moreover, the first housing is provided with at least one first objective. The second housing is provided with at least one second objective. Arranged in the first housing there is at least one first rotational-angle detector for measuring a movement of the optical system. The first housing furthermore has at least one first image stabilizing unit. The second housing is provided with at least one second image stabilizing unit. At least one folding-bridge sensor for measuring a relative angle between the first hinge part and the second hinge part is arranged on the folding bridge. By way of example, the folding-bridge sensor is designed as magnetic sensor or as strain gauge. However, the system described herein is not restricted to such folding-bridge sensors. Rather, it is possible to use any suitable type of folding-bridge sensor. Furthermore, the optical system has at least one first control unit which is connected to the first image stabilizing unit for controlling a movement of the first image stabilizing unit on the basis of the relative angle. Alternatively, or in addition thereto, provision is made for the first control unit to be connected to the second image stabilizing unit for controlling a movement of the second image stabilizing unit on the basis of the relative angle. In particular, provision is made for program code to be loaded into memory of the first control unit, which program code, when executed on a processor of the first control unit, executes a method (first method) with at least one of the aforementioned features or with a combination of at least two of the aforementioned features.

The optical system according to the system described herein is based on the same deliberations as the method (first method) according to the system described herein already explained above. Reference is therefore made to the text above.

In a first exemplary embodiment of the optical system according to the invention, provision is additionally or alternatively made for the first housing to be designed with at least one second rotational-angle detector for measuring the movement of the optical system. Moreover, in a yet further exemplary embodiment of the optical system according to the invention, provision is additionally or alternatively made for the first control unit to be designed for moving the first image stabilizing unit. Furthermore, at least one second control unit is arranged on the optical system, said second control unit being connected to the second image stabilizing unit for controlling the movement of the second image stabilizing unit. In particular, provision is made for program code to be loaded into memory of the second control unit, which program code, when executed on a processor of the second control unit, executes a method (first method) with at least one of the aforementioned features or with a combination of at least two of the aforementioned features.

In a yet further exemplary embodiment of the optical system according to the invention, provision is made for the optical system to have at least one of the following features:
  at least one low-pass filter for filtering at least one first detector signal of the first rotational-angle detector or the second rotational-angle detector in respect of the movement of the optical system; or
  at least one high-pass filter for filtering at least one second detector signal of the first rotational-angle detector or the second rotational-angle detector in respect of the movement of the optical system.

The system described herein also relates to a method (second method) and, like the method already explained further above, this method according to the system described herein is also suitable for setting a first position of a first image stabilizing unit in a first housing of an optical system and/or for setting a second position of a second image stabilizing unit in a second housing of the optical system. Here, provision is made for the first image stabilizing unit to be arranged in the first housing together with at least one first rotational-angle detector. Moreover, the second image stabilizing unit is arranged in the second housing together with at least one second rotational-angle detector. Furthermore, the first housing is connected to the second housing by means of at least one folding bridge. The folding bridge has a first hinge part arranged at the first housing and a second hinge part arranged at the second housing.

The method according to the system described herein now comprises the steps explained in the following text: a movement of the optical system is detected by means of a first rotational-angle detector. Furthermore, a first detector signal, which is based on a first measurement coordinate system of the first rotational-angle detector, is generated. By way of example, the first measurement coordinate system comprises a first measurement axis and a second measurement axis, which are arranged perpendicular to one another. By way of example, the first measurement axis and the second measurement axis are respectively aligned perpendicular to the optical axis of the optical system. Moreover, the movement of the optical system is detected by means of the second rotational-angle detector. A second detector signal, which is based on a second measurement coordinate system of the second rotational-angle detector, is generated. By way of example, the second measurement coordinate system is specified by a third measurement axis and a fourth measurement axis of the second rotational-angle detector. These two measurement axes are arranged perpendicular to one another. By way of example, the third measurement axis and the fourth measurement axis are likewise aligned perpendicular to the optical axis of the optical system. The method according to the system described herein furthermore comprises the following steps:
  transforming the first detector signal into a third detector signal, which is based on the second measurement coordinate system of the second rotational-angle detector,
  transforming the second detector signal into a fourth detector signal, which is based on the first measurement coordinate system of the first rotational-angle detector,
  calculating a first mean value from the third detector signal and the second detector signal,
  calculating a second mean value from the fourth detector signal and the first detector signal,
  moving the first image stabilizing unit on the basis of the second mean value, and
  moving the second image stabilizing unit on the basis of the first mean value.

The aforementioned method according to the system described herein is based on the deliberations outlined below. Provision is in each case made for at least one rotational-angle detector to be arranged in both the first housing and in the second housing. Each of the two rotational-angle detectors has an inherent coordinate system, which has a fixed relation to the rotational coordinate system of the first image stabilizing unit or the second image stabilizing unit, which is arranged in the respective housing. Hence the movement data established by a rotational-angle detector arranged in one of the housings can be used for that image stabilizing unit which is arranged in the identical housing. It is not mandatory to measure the relative angle between the two housings. However, as explained above, every rotational-angle detector has thermal noise. The noise component of each of the two rotational-angle detectors is different. However, the noise does not lead to the whole image being moved in accordance with the noise component; rather, this movement now differs for the first housing and the second housing, and so the images for the two eyes of a user move with respect to one another. This is uncomfortable for the user.

The method according to the system described herein is now based on the surprising discovery of the deliberations that the detector signals of the two rotational-angle detectors can be combined such that a common signal is generated both for the subsystem of the first housing and for the subsystem of the second housing, with, however, the different coordinate systems of the image stabilizing units arranged in the two housings being taken into account. What is taken into account here is that the two rotational-angle detectors in principle generate detector signals which are based on one and the same movement of the optical system. The surprising discovery also comprises the step of transforming the first detector signal of the first rotational-angle detector, which is arranged in the first housing, into the second coordinate system of the second rotational-angle detector, which is arranged in the second housing. Conversely, the second detector signal of the second rotational-angle detector, which is arranged in the second housing, is transformed into the first coordinate system of the first rotational-angle detector, which is arranged in the first housing. It is now subsequently possible to form the mean value from the transformed detector signal of the first rotational-angle detector, which is arranged in the first housing, and the second detector signal of the second rotational-angle detector, which is arranged in the second housing. This mean value is used for the second image stabilizing unit, which is arranged in the second housing. Moreover, the mean value is also formed from the transformed second detector signal of the second rotational-angle detector, which is arranged in the second housing, and the first detector signal of the first rotational-angle detector, which is arranged in the first housing. This mean value is used for the first image stabilizing unit, which is arranged in the first housing.

An advantage of the method according to the system described herein lies in the fact that the noise of the individual rotational-angle detectors is also reduced, and hence the remaining trembling in an image also decreases. A further advantage consists of the fact that different amounts of noise for units of the first housing and for units of the second housing are distributed symmetrically to the first housing and the second housing. Reference is explicitly made to the fact that the method according to the system described herein is not restricted to the use of two rotational-angle detectors. Rather, the method according to the system described herein can also make use of more than two rotational-angle detectors.

In one exemplary embodiment of the method according to the invention, provision is additionally or alternatively made for the method to comprise the following explained steps. Firstly, the first detector signal can be transformed into the third detector signal as follows:

$$b_x = a_x \cdot \gamma_1 + a_y \cdot \gamma_2, \quad \text{Equation 3}$$

$$b_y = a_x \cdot \gamma_3 + a_y \cdot \gamma_4, \quad \text{Equation 4}$$

wherein
$a_x$ is a first partial signal of the movement of the optical system relative to a first measurement axis of the first measurement coordinate system;
$a_y$ is a second partial signal of the movement of the optical system relative to a second measurement axis of the first measurement coordinate system;
$b_x$ is a first transformed partial signal of the first partial signal;
$b_y$ is a second transformed partial signal of the second partial signal;
$\gamma_1$ is a first predeterminable transformation factor;
$\gamma_2$ is a second predeterminable transformation factor;
$\gamma_3$ is a third predeterminable transformation factor; and
$\gamma_4$ is a fourth predeterminable transformation factor.
The second detector signal is transformed into the fourth detector signal by means of $$a'_x = b'_x \cdot \gamma'_1 + b'_y \cdot \gamma'_2, \quad \text{Equation 5}$$

$$a'_y = b'_x \cdot \gamma'_3 + b'_y \cdot \gamma'_4, \quad \text{Equation 6}$$

wherein
$b'_x$ is a third partial signal of the movement of the optical system relative to a third measurement axis of the second measurement coordinate system;
$b'_y$ is a fourth partial signal of the movement of the optical system relative to a fourth measurement axis of the second measurement coordinate system;
$a'_x$ is a third transformed partial signal of the third partial signal;
$a'_y$ is a fourth transformed partial signal of the fourth partial signal;
$\gamma'_1$ is a first predeterminable inverse transformation factor;
$\gamma'_2$ is a second predeterminable inverse transformation factor;
$\gamma'_3$ is a third predeterminable inverse transformation factor; and
$\gamma'_4$ is a fourth predeterminable inverse transformation factor.

In a further exemplary embodiment of the method according to the invention, provision is additionally or alternatively made for the provision of at least one of the following steps. Thus, the first mean value is calculated by $$x_2 = \frac{(b'_x + b_x)}{2} \quad \text{Equation 7}$$

$$y_2 = \frac{(b'_y + b_y)}{2} \quad \text{Equation 8}$$

wherein $x_2$ is a first rotational coordinate about the third axis of the second measurement coordinate system and wherein $y_2$ is a second rotational coordinate about the fourth axis of the second measurement coordinate system. The second mean value is calculated by $$x_1 = \frac{(a'_x + a_x)}{2} \quad \text{Equation 9}$$

$$y_1 = \frac{(a'_y + a_y)}{2} \quad \text{Equation 10}$$

wherein $x_1$ is a first rotational coordinate about the first axis of the first measurement coordinate system and wherein $y_1$ is a second rotational coordinate about the second axis of the first measurement coordinate system.

In a yet further exemplary embodiment of the method according to the invention, provision is made for the predeterminable transformation factors or the predeterminable inverse transformation factors to be established in a specific manner. By way of example, this is brought about as illustrated below:

establishing the first predeterminable transformation factor $\gamma_1$ by $$\gamma_1 = \frac{(a_y \cdot b_y + a_x \cdot b_x)}{(a_x)^2 + (a_y)^2}, \quad \text{Equation 11}$$

establishing the second predeterminable transformation factor $\gamma_2$ by $$\gamma_2 = \frac{(a_y \cdot b_x - a_x \cdot b_y)}{(a_x)^2 + (a_y)^2}, \quad \text{Equation 12}$$

establishing the third predeterminable transformation factor $\gamma_3$ by $$\gamma_3 = \frac{(a_x \cdot b_y - a_y \cdot b_x)}{(a_x)^2 + (a_y)^2}, \quad \text{Equation 13}$$

establishing the fourth predeterminable transformation factor $\gamma_4$ by $$\gamma_4 = \frac{(a_x \cdot b_x + a_y \cdot b_y)}{(a_x)^2 + (a_y)^2}, \quad \text{Equation 14}$$

establishing the first predeterminable inverse transformation factor $\gamma'_1$ by $$\gamma'_1 = \frac{(a'_y \cdot b'_y + a'_x \cdot b'_x)}{(a'_x)^2 + (a'_y)^2}, \quad \text{Equation 15}$$

establishing the second predeterminable inverse transformation factor $\gamma'_2$ by $$\gamma'_2 = \frac{(a'_x \cdot b'_y - a'_y \cdot b'_x)}{(a'_x)^2 + (a'_y)^2}, \quad \text{Equation 16}$$

establishing the third predeterminable inverse transformation factor $\gamma'_3$ by $$\gamma'_3 = \frac{(a'_y \cdot b'_x - a'_x \cdot b'_y)}{(a'_x)^2 + (a'_y)^2}, \quad \text{Equation 17}$$

establishing the fourth predeterminable inverse transformation factor $\gamma'_4$ by $$\gamma'_4 = \frac{(a'_x \cdot b'_x + a'_y \cdot b'_y)}{(a'_x)^2 + (a'_y)^2}. \quad \text{Equation 18}$$

In a yet further exemplary embodiment of the method according to the invention, provision is additionally or alternatively made for the transformation factors and inverse transformation factors to satisfy specific relations. In this exemplary embodiment of the method according to the invention, at least one of the following equations applies:

$\gamma_2 = -\gamma_3$      Equation 19

$\gamma'_2 = -\gamma_3$      Equation 20

$\gamma'_1 = \gamma_1$      Equation 21

$\gamma'_4 = \gamma_4$      Equation 22

$\gamma_2 = -\sin(\arccos(\gamma_1))$      Equation 23

$\gamma_1 = \cos(\arcsin(\gamma_2))$      Equation 24

$\gamma'_2 = \sin(\arccos(\gamma'_1))$      Equation 25

$\gamma'_1 = \cos(\arcsin(\gamma'_2))$      Equation 26

In a further exemplary embodiment of the method according to the invention, provision is additionally or alternatively made for the method to comprise at least one of the following steps:
processing the first detector signal by means of a first low-pass filter and generating a first filtered detector signal;
processing the first detector signal by means of a first low-pass filter, which has a cutoff frequency of 1 Hz, and generating a first filtered detector signal;
processing the second detector signal by means of a second low-pass filter and generating a second filtered detector signal; or
processing the second detector signal by means of a second low-pass filter, which has a cutoff frequency of 1 Hz, and generating a second filtered detector signal.

Deliberations have shown that the generation of the transformation factors and/or the inverse transformation factors by means of the detector signals of the first rotational-angle detector and the second rotational-angle detector can also lead to noise in the transformation factors and/or the inverse transformation factors. This can result in relative movement between the images in the first housing and the second housing. In order to avoid this, the noise of the transformation factors and/or the inverse transformation factors should be suppressed to the greatest possible extent. By way of example, to this end the system described herein provides for the transformation factors, the inverse transformation factors and/or the detector signals of the individual rotational-angle detectors to be filtered with a low-pass filter. The frequency range which is to be filtered out should in this case lie significantly below the lower cutoff of the stabilizing frequencies but above the frequency of a change of the eye distance. A lower cutoff of 0.2 Hz and 1 Hz lends itself to this.

As an alternative to low-pass filtering, or in addition thereto, a calculation of the transformation factors and/or the inverse transformation factors by means of an average calculation also lends itself to eliminating the noise. To this end, the transformation factors and/or the inverse transformation factors are established by at least one of the following steps:

establishing the first predeterminable transformation factor $\gamma_1$ by $$\gamma_1 = \frac{(\langle a_y \rangle \cdot \langle b_y \rangle + \langle a_x \rangle \cdot \langle b_x \rangle)}{(\langle a_x \rangle)^2 + (\langle a_y \rangle)^2}, \quad \text{Equation 27}$$

establishing the second predeterminable transformation factor $\gamma_2$ by $$\gamma_2 = \frac{(\langle a_y \rangle \cdot \langle b_x \rangle - \langle a_x \rangle \cdot \langle b_y \rangle)}{(\langle a_x \rangle)^2 + (\langle a_y \rangle)^2}, \quad \text{Equation 28}$$

establishing the third predeterminable transformation factor $\gamma_3$ by $$\gamma_3 = \frac{(\langle a_x \rangle \cdot \langle b_y \rangle - \langle a_y \rangle \cdot \langle b_x \rangle)}{(\langle a_x \rangle)^2 + (\langle a_y \rangle)^2}, \quad \text{Equation 29}$$

establishing the fourth predeterminable transformation factor $\gamma_4$ by $$\gamma_4 = \frac{(\langle a_x \rangle \cdot \langle b_x \rangle + \langle a_y \rangle \cdot \langle b_y \rangle)}{(\langle a_x \rangle)^2 + (\langle a_y \rangle)^2}, \quad \text{Equation 30}$$

establishing the first predeterminable inverse transformation factor $\gamma'_1$ by $$\gamma'_1 = \frac{(\langle a'_y \rangle \cdot \langle b'_y \rangle + \langle a'_x \rangle \cdot \langle b'_x \rangle)}{(\langle a'_x \rangle)^2 + (\langle a'_y \rangle)^2},$$ Equation 31 establishing the second predeterminable inverse transformation factor $\gamma'_2$ by $$\gamma'_2 = \frac{(\langle a'_x \rangle \cdot \langle b'_y \rangle - \langle a'_y \rangle \cdot \langle b'_x \rangle)}{(\langle a'_x \rangle)^2 + (\langle a'_y \rangle)^2},$$ Equation 32 establishing the third predeterminable inverse transformation factor $\gamma'_3$ by $$\gamma'_3 = \frac{(\langle a'_y \rangle \cdot \langle b'_x \rangle - \langle a'_x \rangle \cdot \langle b'_y \rangle)}{(\langle a'_x \rangle)^2 + (\langle a'_y \rangle)^2},$$ Equation 33 establishing the fourth predeterminable inverse transformation factor $\gamma'_4$ by $$\gamma'_4 = \frac{(\langle a'_x \rangle \cdot \langle b'_x \rangle + \langle a'_y \rangle \cdot \langle b'_y \rangle)}{(\langle a'_x \rangle)^2 + (\langle a'_y \rangle)^2},$$ Equation 34 wherein
$\langle a_x \rangle$ is a first filtered partial signal of the movement of the optical system relative to a first measurement axis of the first measurement coordinate system;
$\langle a_y \rangle$ is a second filtered partial signal of the movement of the optical system relative to a second measurement axis of the first measurement coordinate system;
$\langle b_x \rangle$ is a first filtered transformed partial signal of the first partial signal;
$\langle b_y \rangle$ is a second filtered transformed partial signal of the second partial signal;
$\langle b'_x \rangle$ is a third filtered partial signal of the movement of the optical system relative to a third measurement axis of the second measurement coordinate system;
$\langle b'_y \rangle$ is a fourth filtered partial signal of the movement of the optical system relative to a fourth measurement axis of the second measurement coordinate system;
$\langle a'_x \rangle$ is a third filtered transformed partial signal of the third partial signal; and wherein
$\langle a'_y \rangle$ is a fourth filtered transformed partial signal of the fourth partial signal.

In a further exemplary embodiment, instead of using the filtered partial signals, provision is alternatively made for determining a mean value from the respective partial signals over a predeterminable period of time and to use this mean value for calculating the transformation factors and/or the inverse transformation factors. In this exemplary embodiment, $\langle a_x \rangle$ then is a first mean value of the first partial signals of the movement of the optical system relative to the first measurement axis of the first measurement coordinate system over the predeterminable period of time. Corresponding statements then apply for the further variables.

In a yet further exemplary embodiment of the method according to the invention, the method additionally or alternatively comprises at least one of the following steps:
processing at least one of the predeterminable transformation factors or predeterminable inverse transformation factors by means of a high-pass filter and generating a high-pass filter signal; or
processing at least one of the predeterminable transformation factors or predeterminable inverse transformation factors by means of a high-pass filter, which has a cutoff frequency of 0.2 Hz, and generating a high-pass filter signal.

This exemplary embodiment is based on the following deliberation. As long as the eye distance is not changed by a user, the relative angle between the first hinge part and the second hinge part remains constant. In this case, there will be no change in the transformation factors or the inverse transformation factors (particularly the mean values of the transformation factors and/or the inverse transformation factors calculated according to the equations above). However, if the folding bridge is set anew, the transformation factors and/or the inverse transformation factors also change. Thus, in order to identify whether the folding bridge is adjusted in actual fact, provision is made for observing the transformation factors and/or the inverse transformation factors. If a change in the transformation factors and/or the inverse transformation factors is determined, the assumption can be made that there is a change in the setting of the folding bridge. Whether there is a change in the transformation factors and/or the inverse transformation factors can, for example, take place by high-pass filtering of one or more of the transformation factors and/or the inverse transformation factors. If the filtered transformation factor(s) and/or inverse transformation factor(s) exceeds or exceed a predeterminable value, a change in the folding bridge is thus identified. In a further exemplary embodiment, provision is additionally or alternatively made for the step of processing at least one of the predeterminable transformation factors and predeterminable inverse transformation factors by means of a high-pass filtering to comprise a step of processing a sum of at least two of the predeterminable transformation factors or of at least two of the predeterminable inverse transformation factors. If a change is determined in the transformation factors and/or the inverse transformation factors, the transformation factors and/or the inverse transformation factors are then determined anew, for example as already described further above.

According further to the system described herein, an optical system for imaging an object is provided, in particular for carrying out the above-described second method. The optical system according to the system described herein has at least one first housing and at least one second housing, wherein the first housing is connected to the second housing by means of at least one folding bridge. The folding bridge has a first hinge part arranged at the first housing. Furthermore, the folding bridge has a second hinge part arranged at the second housing. The first housing has at least one first objective. Furthermore, the second housing is provided with at least one second objective. The first housing has at least one first rotational-angle detector for measuring a movement of the optical system. Furthermore, the first housing is provided with at least one first image stabilizing unit. The second housing is provided with at least one second image stabilizing unit. The second housing has at least one second rotational-angle detector for measuring a movement of the optical system. At least one control unit is arranged on the optical system, said control unit being connected to the first image stabilizing unit for controlling a movement of the first image stabilizing unit and/or said control unit being connected to the second image stabilizing unit for controlling a movement of the second image stabilizing unit. In particular, provision is made for the optical system according to the system described herein to have at least one low-pass filter and/or at least one high-pass filter. In addition or as an alternative thereto, provision is made for the control unit to have a memory unit into which program code can be loaded, which, when executed on a processor of the control unit, executes the above-described second method with at least one of the aforementioned features or with a combination of at least two of the aforementioned features.

BRIEF DESCRIPTION OF THE DRAWINGS

Embodiments of the system described herein will now be explained in more detail on the basis of the figures. Here:

FIG. 1B shows a second schematic illustration of the field glasses according to FIG. 1A;

FIG. 2B shows a third schematic illustration of the field glasses according to FIG. 1A;

FIG. 2C shows a first sectional illustration of the field glasses along the line A-A as per FIG. 2B;

FIG. 2D shows a second sectional illustration of the field glasses along the line A-A as per FIG. 2B;

FIG. 2E shows a magnified sectional illustration of an image stabilizing unit of the field glasses as per FIGS. 2C and 2D;

DETAILED DESCRIPTION OF VARIOUS EMBODIMENTS

In the following text, the system described herein will be discussed on the basis of an optical system in the form of binocular field glasses 1 (only referred to as field glasses below). However, reference is explicitly made to the fact that the system described herein is not restricted to binocular field glasses. Rather, the system described herein is suitable for any optical system, for example also in the case of a telescope.

Figure 1A:
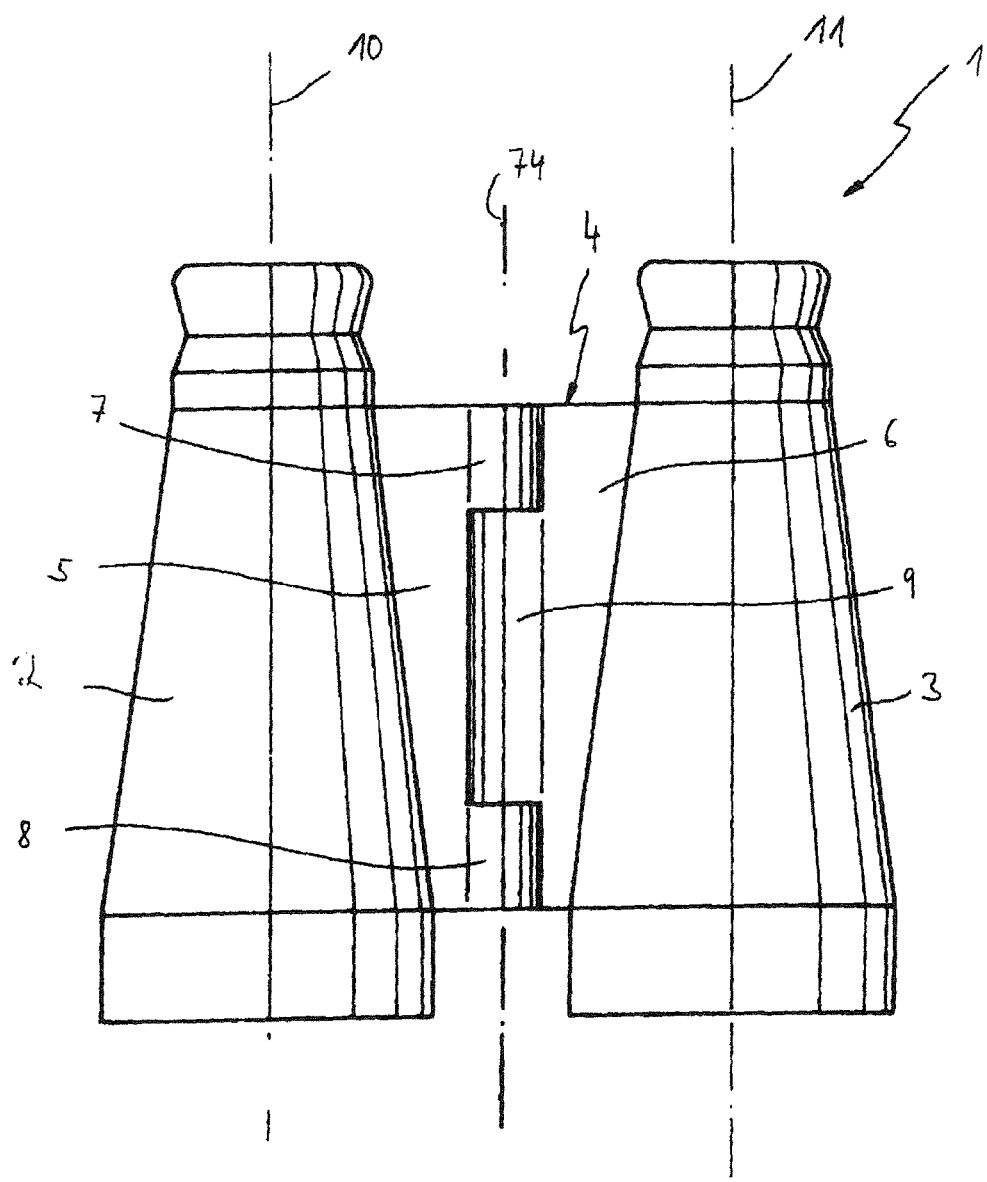
FIG. 1A shows a first schematic illustration of an optical system in the form of field glasses with a folding bridge.

FIG. 1A shows a first schematic illustration of the field glasses 1, which have a tube-shaped first housing part 2 and a tube-shaped second housing part 3. A first optical axis 10 extends through the first housing part 2. By contrast, a second optical axis 11 extends through the second housing part 3. The first housing part 2 is connected to the second housing part 3 by means of a folding bridge 4. The folding bridge 4 has a first hinge part 5, which is formed onto the first housing part 2. Furthermore, the folding bridge 4 has a second hinge part 6, which is arranged on the second housing part 3. The first hinge part 5 has a first holding part 7 and a second holding part 8, between which a third holding part 9 of the second hinge part 6 is arranged. An axle pin (not illustrated) extends through the first holding part 7, the second holding part 8 and the third holding part 9 such that the relative position of the first housing part 2 and the second housing part 3 can be set with respect to one another about an articulation axis 74. This renders it possible to set the first housing part 2 and the second housing part 3 to the intraocular distance of a user such that, firstly, the first housing part 2 is arranged in front of one of the two eyes of the user and such that, secondly, the second housing part 3 is arranged in front of the other one of the two eyes of the user.

FIG. 1B shows a further illustration of the field glasses 1. The first housing part 2 has a first optical subsystem 12. The first optical subsystem 12 is provided with a first objective 14A, with a first image stabilizing unit 16A embodied as a first prism system and with a first eyepiece 17A. A first eye 15A of a user can be arranged in front of the first eyepiece 17A for the purpose of observing an object O. The first optical axis 10 of the first optical subsystem 12 is slightly offset laterally as a result of the first prism system 16A (first image stabilizing unit 16A), and so the first optical axis 10 has a step-like embodiment.

In this exemplary embodiment, the first objective 14A consists of a first front unit 51A and a first focusing unit 52A. Further embodiments of the first objective 14A provide for a different number of individual lenses or cemented components consisting of lenses. For the purposes of focusing the object O observed through the field glasses 1, it is possible to displace either the first eyepiece 17A or the first focusing unit 52A axially along the first optical axis 10. In a further embodiment, the first front unit 51A or even the whole first objective 14A is displaced along the first optical axis 10. In a further embodiment, the first front unit 51A and the first focusing unit 52A are displaced relative to one another.

The second housing part 3 has a second optical subsystem 13. The second optical subsystem 13 is provided with a second objective 14B, with a second image stabilizing unit 16B embodied as a prism system and with a second eyepiece 17B. A second eye 15B of the user can be arranged in front of the second eyepiece 17B for the purpose of observing the object O. The second optical axis 11 of the second optical subsystem 13 is slightly offset laterally as a result of the second image stabilizing unit 16B (prism system), and so the second optical axis 11 has a step-like embodiment.

In this exemplary embodiment, the second objective 14B consists of a second front unit 51B and a second focusing unit 52B. Further embodiments of the second objective 14B provide for a different number of individual lenses or cemented components consisting of lenses. For the purposes of focusing the object O observed through the field glasses 1, it is possible to displace either the second eyepiece 17B or the second focusing unit 52B axially along the second optical axis 11. In a further embodiment, the second front unit 51B or even the whole second objective 14B is displaced along the second optical axis 11. In a further embodiment, the second front unit 51B and the second focusing unit 52B are displaced relative to one another.

In both of the optical subsystems 12, 13 illustrated above, the beam direction of the light beams incident into the optical subsystems 12, 13 is as follows: object O-objective 14A, 14B-image stabilizing unit (prism system) 16A, 16B-eyepiece 17A, 17B-eye 15A, 15B.

For focusing purposes, a rotary knob 53 is arranged on the folding bridge 4 in the exemplary embodiment illustrated here, by means of which rotary knob the first focusing unit 52A and the second focusing unit 52B can be displaced together along the two optical axes 10 and 11. In a further embodiment, provision is made for the first objective 14A and the second objective 14B (or at least units of the first objective 14A and of the second objective 14B) to be adjusted relative to one another.

In the exemplary embodiment illustrated here, both the first objective 14A and the second objective 14B generate a real image, upside-down relative to the observed object O, in an image plane associated with the respective objective 14A, 14B. The first prism system 16A (first image stabilizing unit) associated with the first objective 14A and the second prism system 16B (second image stabilizing unit) associated with the second objective 14B are used for image erection. Hence the upside-down image is re-erected and imaged in a new image plane—the left intermediate image plane 23A or the right intermediate image plane 23B. The first prism system 16A (first image stabilizing unit) and the second prism system 16B (second image stabilizing unit) can be embodied as Abbe-Koenig prism system, Schmidt-Pechan prism system, Uppendahl prism system, Porro prism system or another prism system variant.

By way of example, a first field stop that sharply delimits the field of view is arranged in the left intermediate image plane 23A. Furthermore, a second field stop that sharply delimits the field of view can be arranged for example in the right intermediate image plane 23B.

The first eyepiece 17A is used for imaging the image of the left intermediate image plane 23A into an arbitrary distance, e.g. into infinity or into a different distance. Furthermore, the second eyepiece 17B is used for imaging the image of the right intermediate image plane 23B into an arbitrary distance, e.g. into infinity or into a different distance.

The first aperture stop 54A of the first optical subsystem 12 and the second aperture stop 54B of the second optical subsystem 13 can be formed either by a mount of an optical element of the corresponding optical subsystem 12, 13, generally by the mount of the lenses of the first front unit 51A or of the second front unit 51B, or by a separate stop. It can be imaged in the beam direction through the corresponding optical subsystem 12 or 13 into a plane which lies in the beam direction behind the corresponding eyepiece 17A or 17B and is typically at a distance of 5 to 25 mm therefrom. This plane is called the plane of the exit pupil.

In order to protect the user against laterally incident light, a pull-out, turn-out or foldable first eyecup 55A can be provided at the first eyepiece 17A and a pull-out, turn-out or foldable second eyecup 55B can be provided at the second eyepiece 17B.

Figure 2A:
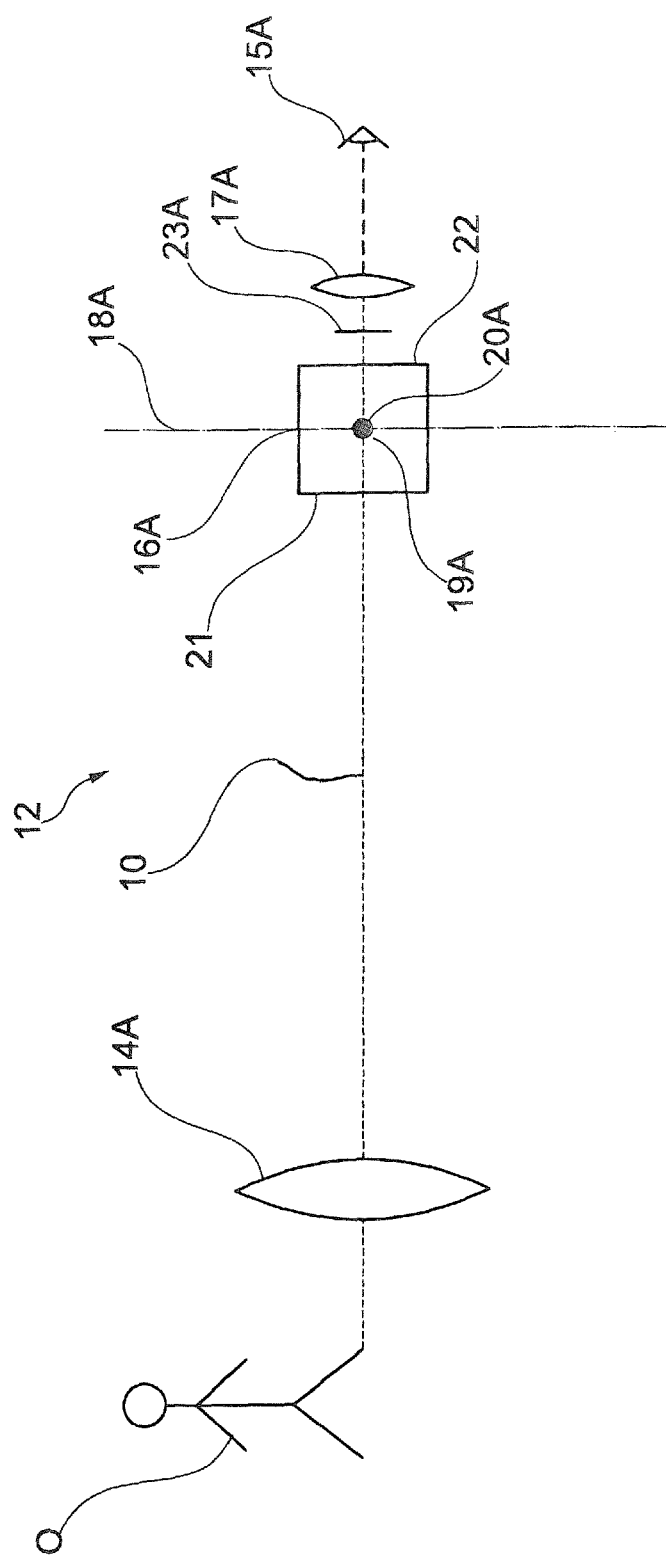
FIG. 2A shows a schematic illustration of a first optical subsystem.

FIG. 2A shows a schematic illustration of the first optical subsystem 12 arranged in the first housing part 2. The second optical subsystem 13 arranged in the second housing part 3 has an identical design to the first optical subsystem 12. Consequently, the explanations below with respect to the first optical subsystem 12 are also applicable to the second optical subsystem 13.

As can be seen from FIG. 2A, the first objective 14A, the first image stabilizing unit 16A and the first eyepiece 17A are arranged along the first optical axis 10 from the object O in the direction of the first eye 15A of the user. In the exemplary embodiment illustrated here, the first image stabilizing unit 16A is embodied as a prism erecting system. As an alternative thereto, provision is made in a further exemplary embodiment for the first image stabilizing unit 16A to be embodied as a lens erecting system. As mentioned above, the second optical subsystem 13 has an identical design to the first optical subsystem 12. Thus, the second prism system here is embodied as second image stabilizing unit 16B.

FIG. 2B shows a further schematic illustration of the field glasses 1. FIG. 2B is based on FIG. 1B. Identical components are provided with identical reference signs. FIG. 2B now also shows the movement devices for the first image stabilizing unit 16A and the second image stabilizing unit 16B. The first image stabilizing unit 16A is arranged in a first cardan-type mount 60A. The second image stabilizing unit 16B is arranged in a second cardan-type mount 60B.

The arrangement of the two image stabilizing units 16A and 16B is illustrated in more detail in FIG. 2C. The first cardan-type mount 60A has a first outer suspension 61A, which is arranged on the first housing part 2 via a first axis 18A. The first outer suspension 61A is arranged in a manner rotatable about the first axis 18A. Furthermore, the first cardan-type mount 60A has a first inner suspension 62A, which is arranged in a rotatable manner on the first outer suspension 61A via a second axis 19A. The first inner suspension 62A is rotated about the second axis 19A by means of a first drive unit 24A. Furthermore, provision is made for a second drive unit 24B, by means of which the first outer suspension 61A is rotated about the first axis 18A. FIG. 2E shows the abovementioned details in a magnified illustration. The first image stabilizing unit 16A is held on the first inner suspension 62A by means of clamping holders 71.

The second image stabilizing unit 16B is arranged on the second cardan-type mount 60B. The second cardan-type mount 60B has a second outer suspension 61B, which is arranged on the second housing part 3 via a third axis 18B. The second outer suspension 61B is arranged in a manner rotatable about the third axis 18B. Furthermore, the second cardan-type mount 60B has a second inner suspension 62B, which is arranged in a rotatable manner on the second outer suspension 61B via a fourth axis 19B. The second inner suspension 62B is rotated about the third axis 19B by means of a third drive unit 24C. Furthermore, a fourth drive unit 24D is provided, by means of which the second outer suspension 61B is rotated about the third axis 18B.

As mentioned above, FIG. 2A shows the first optical subsystem 12. The first image stabilizing unit 16A is arranged by means of the first cardan-type mount 60A in such a way that it is mounted in a manner rotatable about two axes arranged at right angles to one another, namely about the first axis 18A and about the second axis 19A, which projects into the plane of the drawing. The first axis 18A and the second axis 19A intersect at a first intersection point 20A. The first intersection point 20A is arranged such that it differs from a first optically neutral point on the first optical axis 10. In this respect, reference is made to the explanations already given further above.

The first image stabilizing unit 16A has a first entrance surface 21 and a first exit surface 22. The first exit surface 22 is arranged at a distance in a range of 1 mm to 20 mm from the left intermediate image plane 23A. By way of example, the first exit surface 22 is arranged at a distance in a range of 2 mm to 15 mm from the left intermediate image plane 23A. As an alternative thereto, provision is made for the first exit surface 22 to be arranged at a distance in a range of 3 mm to 12 mm from the left intermediate image plane 23A.

As already mentioned above, the statements made above and below with respect to the first optical subsystem 12 are correspondingly applicable to the second optical subsystem 13.

The abovementioned arrangement of the first exit surface 22 of the first image stabilizing unit 16A with respect to the left intermediate image plane 23A firstly achieves the effect of improving the quality of the image generated by the first optical subsystem 12, since manufacturing tolerances which have to be accepted during the production of the first image stabilizing unit 16A no longer have a great effect in the generated image. What is achieved secondly is that, on account of the beam path, the extent and the volume of the first image stabilizing unit 16A can turn out to be smaller in comparison with the prior art. This means that the mass of the first image stabilizing unit 16A can be smaller than in the prior art. In this way, the moment of inertia of the first image stabilizing unit 16A is reduced such that the adjustment of the first image stabilizing unit 16A can be effected with a relatively small force. The smaller volume, the smaller extent and also the possibility of using drive units which provide a small force for adjusting the first image stabilizing unit 16A make it possible that the first housing part 2 can be made smaller than the housing parts used in the prior art. An elegant housing which to the user is reminiscent of normal field glasses is thus provided which gives an esthetically more attractive impression than the known prior art. The embodiment of the field glasses 1 in two tubes (namely a first tube corresponding to the first housing part 2 and a second tube corresponding to the second housing part 3) is also made possible, which corresponds to the division of field glasses that is customary to a user, and which significantly simplifies the setting of the interocular distance. Furthermore, the use of two image stabilizing units (namely the first image stabilizing unit 16A in the first housing part 2 and the second image stabilizing unit 16B in the second housing part 3) makes it possible to reduce the moment of inertia of the two image stabilizing units significantly in comparison with the prior art, such that piezo-actuators can be used.

Figure 3:
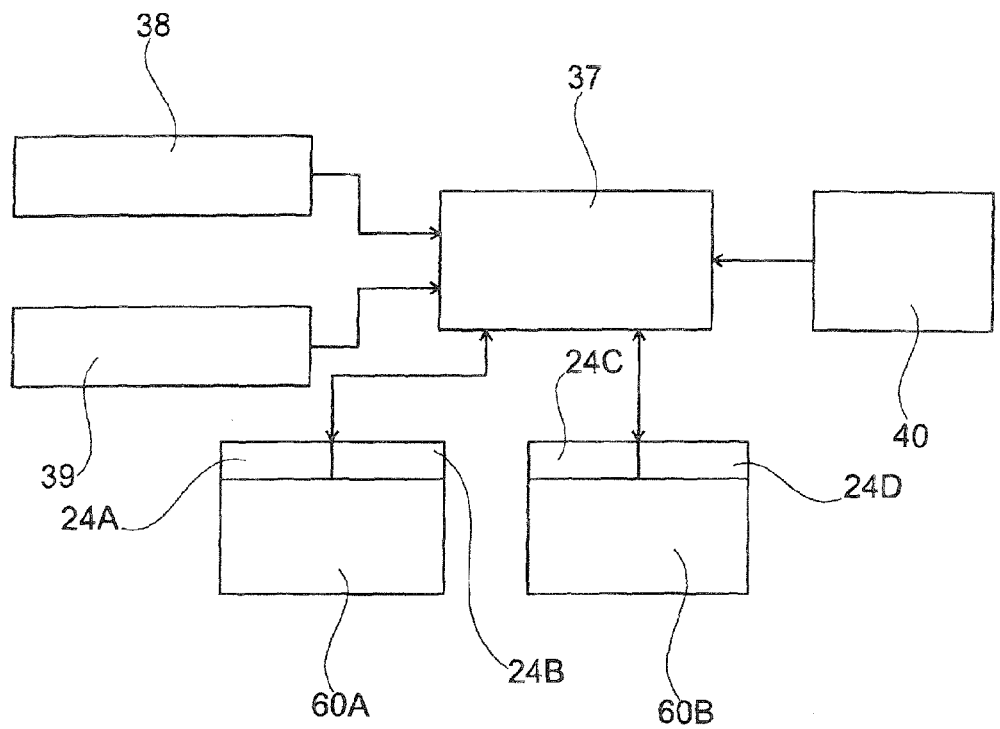
FIG. 3 shows a schematic illustration of a first block diagram of units of the field glasses.

FIG. 3 shows a schematic illustration of a block diagram of units for image stabilization in the optical system in the form of the field glasses 1. The first cardan-type mount 60A of the first image stabilizing unit 16A, the first drive unit 24A and the second drive unit 24B, which are arranged in the first housing part 2, on the one hand, and the second cardan-type mount 60B of the second image stabilizing unit 16B, the third drive unit 24C and the fourth drive unit 24D, which are arranged in the second housing part 3, on the other hand, are connected to a control and supervision unit 37 (for example a microcontroller). The control and supervision unit 37 is in turn connected to a first angular-velocity detector 38 and to a second angular-velocity detector 39. The first angular-velocity detector 38 serves for detecting movements of the field glasses 1 and is arranged in the first housing part 2. The second angular-velocity detector 39 also serves for detecting movements of the field glasses 1 and is arranged in the first housing part 2. The abovementioned movements are, for example, rotational and/or translational trembling movements. The angular-velocity detectors are used to calculate the rotational angle which can be determined by an angular velocity and a predeterminable period of time. However, the system described herein is not restricted to such detectors. Rather, any suitable detector for determining the rotational angle (rotational-angle detector) can be used. Moreover, the control and supervision unit 37 is connected to a folding-bridge sensor 40. The background of the use of the folding-bridge sensor 40 is as follows. The relative position of the axes of rotation (namely the first axis 18A and the second axis 19A of the first image stabilizing unit 16A, on the one hand, and the third axis 18B and the fourth axis 19B of the second image stabilizing unit 16B, on the other hand) changes during the setting of the interocular distance by means of the folding bridge 4. In order to be able to achieve an accurate setting of the rotary movement of the first image stabilizing unit 16A relative to the second image stabilizing unit 16B for image stabilization purposes by positioning the first image stabilizing unit 16A and the second image stabilizing unit 16B, it is desirable to know the exact relative position of the respective axes of rotation. The folding-bridge sensor 40 now establishes a relative angle a between a first hinge part axis 72 of the first hinge part 5 and a second hinge part axis 73 of the second hinge part 6, wherein the first hinge part axis 72 and the second hinge part axis 73 have a common intersection point with the articulation axis 74 (cf. FIGS. 2C and 2D).

By way of example, provision is made in this case for determining the actual folding angle $\alpha_k$ by means of the folding-bridge sensor 40, which will be explained below. By way of example, the relative angle $\alpha$ in FIG. 2C, in which the first axis 18A and the third axis 18B are arranged parallel to one another, can already be 175°. FIG. 2D now illustrates an alignment of the first hinge part axis 72 and of the second hinge part axis 73 in which the relative angle $\alpha$ is 145°, for example. The actual folding angle $\alpha_k$ with respect to the first axis 18A and the third axis 18B is then the difference between the two measured relative angles, i.e. 30°. The folding angle determined in this or a similar way now makes it possible to transform coordinates of a first coordinate system of structural units of the first housing part 2 into coordinates of a second coordinate system of structural units of the second housing part 3.

The position (rotary position) of the first image stabilizing unit 16A and the position (rotary position) of the second image stabilizing unit 16B are set for example in the manner outlined below. An angular velocity on account of a movement of the field glasses 1 relative to the observed surroundings is detected by means of the first angular-velocity detector 38 and the second angular-velocity detector 39. The first angular-velocity detector 38 and the second angular-velocity detector 39 supply angular-velocity signals dependent on the movement. The angular-velocity signals are used in the control and supervision unit 37 to establish rotational angles about the measurement axes of the first angular-velocity detector 38 and rotational angles about the measurement axes of the second angular-velocity detector 39. The rotational angles established thus are now converted into a first (adjustment) angle, through which the first image stabilizing unit 16A must be rotated in order to be positioned in space. Furthermore, the rotational angles are used to calculate a second (adjustment) angle, through which the second image stabilizing unit 16B must be rotated in order to be "fixed" in space. Furthermore, it should be noted that the intersection point of the axes of rotation does not correspond to the optically neutral point of the field glasses 1. By way of example, for the first optical subsystem in the first housing part 2, this means that the first intersection point 20A of the first axis 18A and the second axis 19A does not correspond to the optically neutral point of the field glasses 1 on the first optical axis 10. Thus, the established rotational angle should be multiplied by a factor which is dependent on the field glasses 1 in order to obtain the necessary (adjustment) angle. Here, the relative position of measurement axes of the two angular-velocity detectors 38 and 39 and also the relative position of the rotational axes of the first image stabilizing unit 16A and of the second image stabilizing unit 16B should be taken into account. The corresponding (adjustment) angle is obtained by a suitable transformation, taking into account the folding angle. By way of example, provision is made for the position of the measurement axes of the two angular-velocity detectors 38 and 39 to correspond to the position of the first axis 18A and of the second axis 19A of the first image stabilizing unit 16A. The established folding angle $\alpha_k$ can then be used to transform the (adjustment) angles of the first image stabilizing unit 16A into (adjustment) angles of the second image stabilizing unit 16B. Expressed in other words, first rotational coordinates of a first coordinate system of the first housing part 2 (wherein the first rotational coordinates are provided for the first image stabilizing unit 16A) are now transformed into second rotational coordinates of a second coordinate system of the second housing part 3 (wherein the second rotational coordinates are provided for the second image stabilizing unit 16B). By way of example, the second coordinate system is based on the third axis 18B and the fourth axis 19B of the second image stabilizing unit 16B. By way of example, the transformation is brought about by Equations 1 and 2. The calculation is performed by the control and supervision unit 37.

In principle, this is a transformation of the coordinates of the first measurement axis and of the second measurement axis of the two angular-velocity detectors 38 and 39 into the coordinates of the third axis 18B and the fourth axis 19B of the second image stabilizing unit 16B. There is no need for such a transformation in respect of the first image stabilizing unit 16A. In this respect, reference is likewise made to the text above.

As mentioned above, the first angular-velocity detector 38 and the second angular-velocity detector 39 are arranged in the first housing part 2 (n=2). In the embodiment illustrated here, provision is made for the movement of the field glasses 1 to be determined by determining a rotation of the field glasses 1 with respect to respectively the first measurement axis and with respect to respectively the second measurement axis of each of the two angular-velocity detectors 38 and 39. Furthermore, a first mean value of the rotations about the first measurement axes and a second mean value of the rotations about the second measurement axes are determined. The two mean values are now used to determine the second rotational coordinates for the second image stabilizing unit 16B. As explained above, the number of a plurality of angular-velocity detectors (rotational-angle detectors) reduces the noise.

Figure 4:
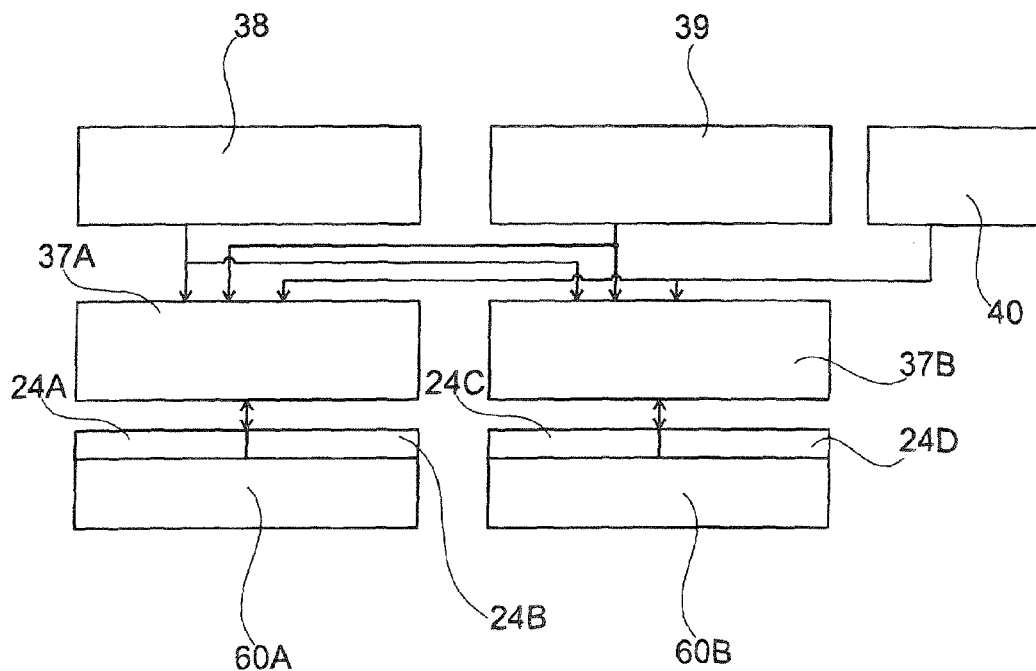
FIG. 4 shows a schematic illustration of a second block diagram of units of the field glasses.

FIG. 4 is a block diagram of a further embodiment of units for image stabilization, which is based on the exemplary embodiment in FIG. 3. Identical structural units are therefore provided with identical reference signs. In contrast to the embodiment in accordance with FIG. 3, the embodiment in accordance with FIG. 4 has two control and supervision units, namely a first control and supervision unit 37A and a second control and supervision unit 37B. The first control and supervision unit 37A is connected to the first angular-velocity detector 38, to the first cardan-type mount 60A of the first image stabilizing unit 16A, to the first drive unit 24A and to the second drive unit 24B. The first control and supervision unit 37A is arranged in the first housing part 2, for example. The second control and supervision unit 37B is connected to the second angular-velocity detector 39, to the second cardan-type mount 60B of the image stabilizing unit 16B, to the third drive unit 24C and to the fourth drive unit 24D. The second control and supervision unit 37B is arranged in the second housing part 3, for example. The folding-bridge sensor 40 is connected both to the first control and supervision unit 37A and to the second control and supervision unit 37B. Moreover, the first angular-velocity detector 38 is connected to the second control and supervision unit 37B. Furthermore, the second angular-velocity detector 39 is connected to the first control and supervision unit 37A. This exemplary embodiment accordingly uses in each case a separate control and supervision unit on the one hand for the first optical subsystem 12 in the first housing part 2 and on the other hand for the second optical subsystem 13 in the second housing part 3, wherein, however, the angular-velocity detectors 38, 39 are used jointly for detecting movements of the field glasses 1, as e.g. described above and below.

Figure 5:
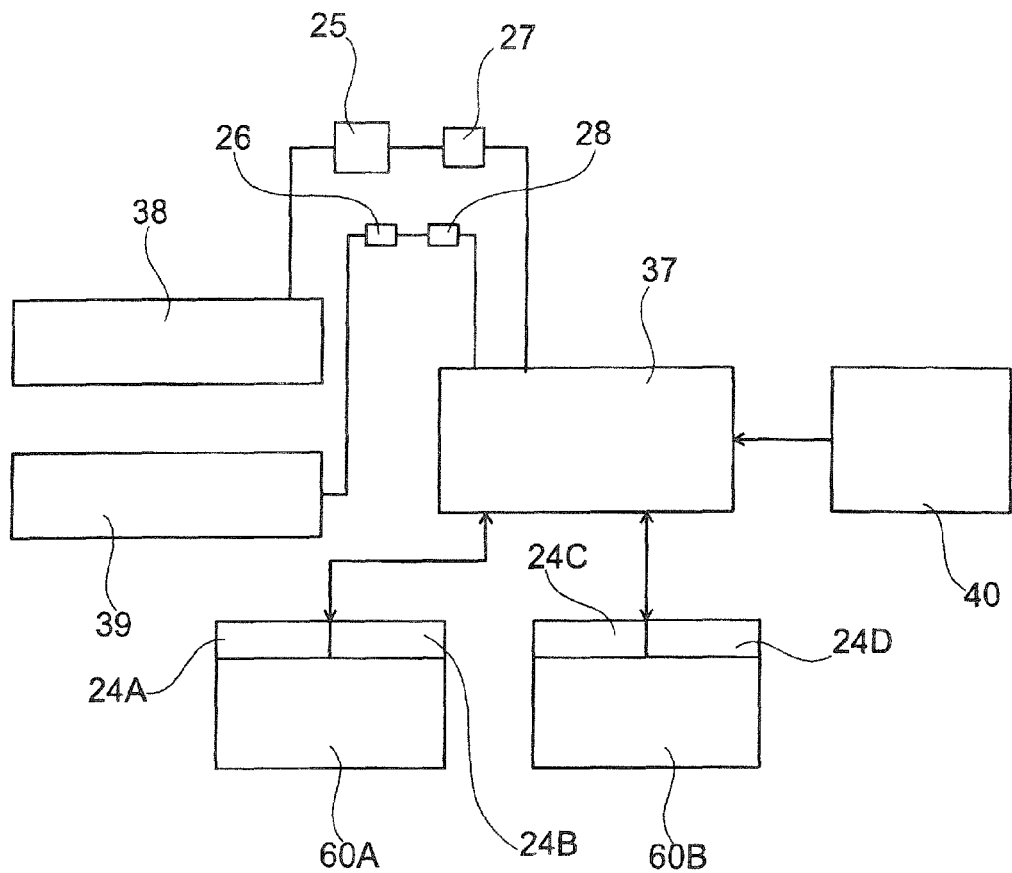
FIG. 5 shows a schematic illustration of a third block diagram of units of the field glasses.

FIG. 5 is a block diagram of a further embodiment of units for image stabilization, which is based on the exemplary embodiment in FIG. 3. Identical structural units are therefore provided with identical reference signs. In contrast to the embodiment in accordance with FIG. 3, the embodiment in accordance with FIG. 5 has a first low-pass filter 25 and a first high-pass filter 27, by means of which the detector signals of the first angular-velocity detector 38 are filtered. Furthermore, provision is made for a second low-pass filter 26 and a second high-pass filter 28, by means of which the detector signals of the second angular-velocity detector 39 are filtered. The filtered detector signals are fed to the control and supervision unit 37. The two angular-velocity detectors 38 and 39 have a noise component which influences the image. This is undesirable. In order to reduce such noise, the bandwidth of the detector signals of the two angular-velocity detectors 38 and 39 is reduced. The noise outside of this bandwidth (frequency range) is suppressed. This is brought about by filtering the detector signals by means of the two aforementioned high-pass filters 27, 28 and the two aforementioned low-pass filters 25, 26. Hence there is no longer noise with frequencies above and below this frequency range. The use of the aforementioned noise suppression is advantageous because only trembling movements with a frequency up to approximately 20 Hz are visible in the image. Movements having a movement frequency above 20 Hz only lead to unsharpness in the image because they lie above a frequency which can be identified as movement by the human eye. In the case of movements below a frequency of 0.5 Hz, there are only relatively few involuntary trembling movements but increasingly the voluntary movement of the user. Thus a frequency range of e.g. 0.5 Hz to 20 Hz is used.

Figure 6:
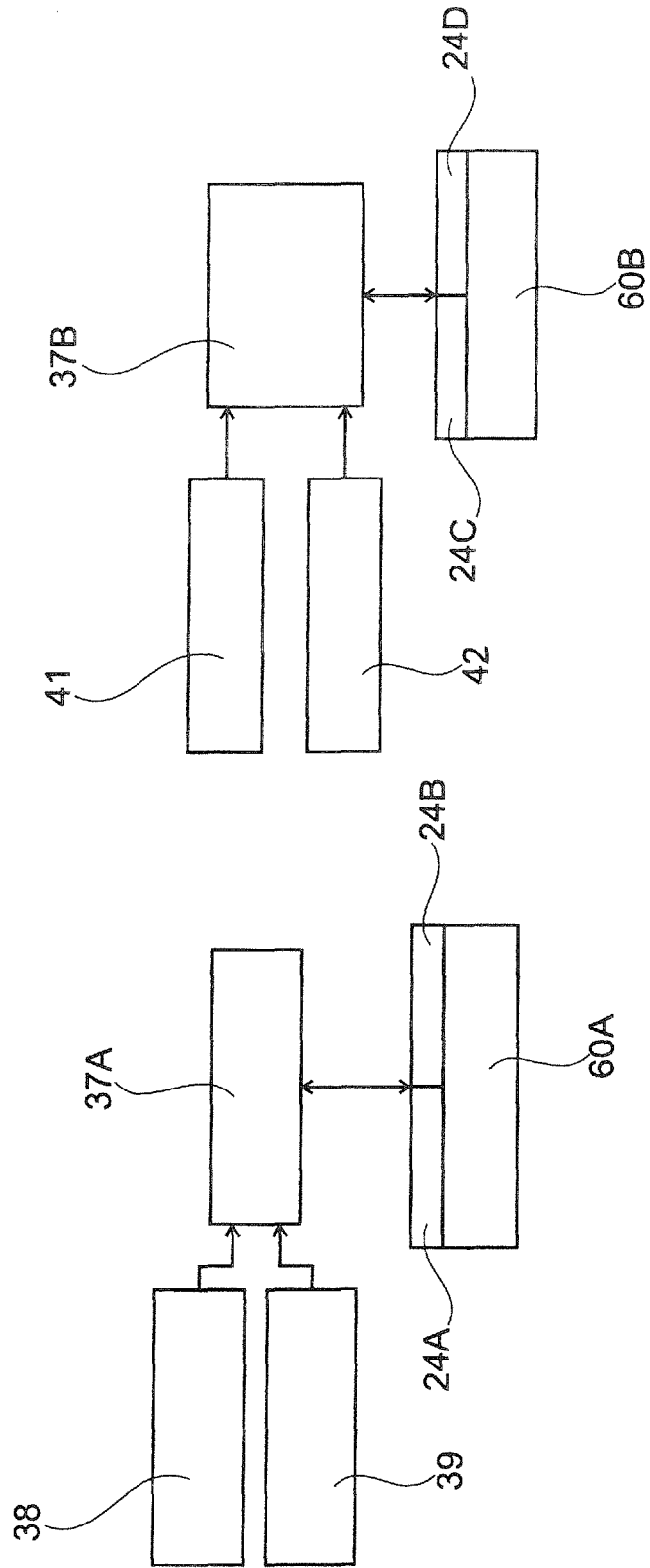
FIG. 6 shows a schematic illustration of a fourth block diagram of units of the field glasses.

FIG. 6 shows a block diagram of a further embodiment of an arrangement of units for image stabilization. The exemplary embodiment in FIG. 6 is based on the exemplary embodiment in FIG. 3. Identical structural units are provided with identical reference signs. Provision is made in this exemplary embodiment for each of the two aforementioned housing parts 2 and 3 to be provided with a separate control unit. Thus, the first image stabilizing unit 16A with the first cardan-type mount 60A, the first drive unit 24A, the second drive unit 24B and the first control and supervision unit 37A are arranged in the first housing part 2. The first control and supervision unit 37A is connected to the first angular-velocity detector 38 and the second angular-velocity detector 39, which are likewise arranged in the first housing part 2. By contrast, the second image stabilizing unit 16B with the second cardan-type mount 60B, the third drive unit 24C, the fourth drive unit 24D and the second control and supervision unit 37B are arranged in the second housing part 3. Furthermore, a third angular-velocity detector 41 and a fourth angular-velocity detector 42 are arranged in the second housing part 3, which detectors establish the movements of the field glasses 1.

The exemplary embodiment illustrated in FIG. 6 serves to carry out the method explained below. A movement of the field glasses 1 is detected by means of the first angular-velocity detector 38 and the second angular-velocity detector 39. First detector signals are generated, which are respectively based on a first measurement coordinate system of the first angular-velocity detector 38 and of the second angular-velocity detector 39. By way of example, the first measurement coordinate system comprises a first measurement axis and a second measurement axis, which are arranged perpendicular to one another. By way of example, the first measurement axis and the second measurement axis are respectively aligned perpendicular to the first optical axis 10 of the field glasses 1. A mean value is formed from the obtained detector signals. Moreover, the movement of the field glasses 1 is detected by means of the third angular-velocity detector 41 and the fourth angular-velocity detector 42. Second detector signals are generated, which are respectively based on a second measurement coordinate system of the third angular-velocity detector 41 and of the fourth angular-velocity detector 42. By way of example, the second measurement coordinate system comprises a third measurement axis and a fourth measurement axis, which are arranged perpendicular to one another. By way of example, the third measurement axis and the fourth measurement axis are respectively aligned perpendicular to the second optical axis of the field glasses 1. A further mean value is formed from the obtained detector signals. Now the following method steps take place:

- transforming the first detector signal into a third detector signal, which is based on the second measurement coordinate system of the third angular-velocity detector 41;
- transforming the second detector signal into a fourth detector signal, which is based on the first measurement coordinate system of the first angular-velocity detector 38;
- calculating a first detector mean value from the third detector signal and the second detector signal,
- calculating a second detector mean value from the fourth detector signal and the first detector signal,
- moving the first image stabilizing unit 16A on the basis of the second detector mean value, and
- moving the second image stabilizing unit 16B on the basis of the first detector mean value.

In respect of the advantages and effect of this method, reference is made to the text above.

In the exemplary embodiment of the method illustrated here, provision is made for the first detector signal to be transformed into the third detector signal according to Equations 3 and 4, which were already explained above. By way of example, the second detector signal is transformed into the fourth detector signal by means of Equations 5 and 6, which were already explained above. All calculations are performed in the first control and supervision unit 37A or in the second control and supervision unit 37B.

Furthermore, provision is made in the exemplary embodiment illustrated here for the first detector mean value to be calculated in accordance with Equations 7 and 8. The second detector mean value is calculated according to Equations 9 and 10. All calculations are performed in the first control and supervision unit 37A or in the second control and supervision unit 37B.

In the exemplary embodiment of the method illustrated here, provision is made for the predeterminable transformation factors or the predeterminable inverse transformation factors to be established in a particular way. By way of example, this is brought about by Equations 11 to 18, as already explained above. All calculations are performed in the first control and supervision unit 37A or in the second control and supervision unit 37B. Furthermore, provision is made in this exemplary embodiment for the transformation factors and inverse transformation factors to satisfy specific relations. In this exemplary embodiment of the method, Equations 19 to 26, which have already been mentioned above, apply.

Figure 7:
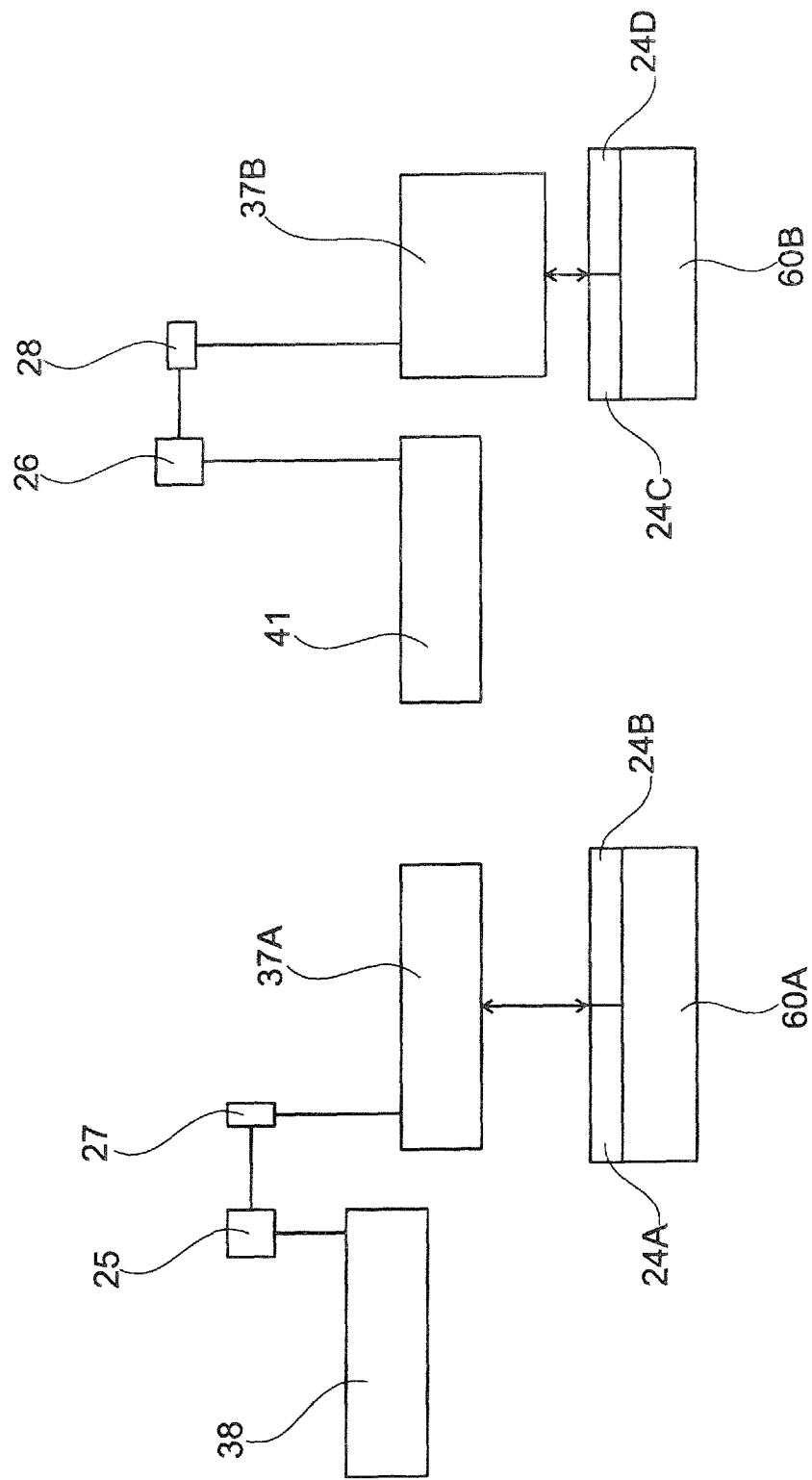
FIG. 7 shows a schematic illustration of a fifth block diagram of units of the field glasses.

FIG. 7 shows a block diagram of a further exemplary embodiment of an arrangement of units for image stabilization. The exemplary embodiment of FIG. 7 is based on the exemplary embodiment in FIG. 6. Identical structural units are provided with identical reference signs. In contrast to the exemplary embodiment in accordance with FIG. 6, the exemplary embodiment in accordance with FIG. 7 only has the first angular-velocity detector 38 in the first housing part 2. Provision is only made for the third angular-velocity detector 41 in the second housing part 3. The detector signal from the first angular-velocity detector 38 is filtered by means of a first low-pass filter 25 and by means of a first high-pass filter 27. Furthermore, the detector signal from the third angular-velocity detector 41 is filtered by means of a second low-pass filter 26 and by means of a second high-pass filter 28. The cutoff frequency of the first low-pass filter 25 and of the second low-pass filter 26 lies at 1 Hz. As already explained previously, this is carried out to suppress the noise of the transformation factors and/or of the inverse transformation factors to the best possible extent.

As an alternative to low-pass filtering, or in addition thereto, a calculation of the transformation factors and/or of the inverse transformation factors by means of an average calculation also lends itself to eliminating the noise. To this end, the transformation factors and/or the inverse transformation factors are determined by Equations 27 to 34, which have already been explained above. All calculations are performed in the first control and supervision unit 37A or in the second control and supervision unit 37B. In a further exemplary embodiment, use is alternatively not made of the filtered partial signals, but provision is made for a mean value from the respective partial signals to be determined over a predeterminable period of time and for this mean value to be used to calculate the transformation factors and/or the inverse transformation factors, as already explained above.

The cutoff frequency of the first high-pass filter 27 and of the second high-pass filter 28 lies at approximately 0.2 Hz. By filtering the detector signals with the first high-pass filter 27 and with the second high-pass filter 28 it is possible to determine a change in the relative angle between the first hinge part 5 and the second hinge part 6, as likewise explained above. The changes in detector signals also lead to a change in the transformation factors and/or the inverse transformation factors. If a change is determined, the transformation factors and/or the inverse transformation factors are then determined anew, for example as already described further above.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method for setting a position of one or more image stabilizing units of an optical system, wherein a first image stabilizing unit is one of: a prism erecting system and a lens erecting system and is arranged in a first housing along with a first objective and a first eyepiece having the first image stabilizing unit therebetween, wherein a second image stabilizing unit is one of: a prism erecting system and a lens erecting system and is arranged in a second housing along with a second objective and a second eyepiece having the second image stabilizing unit therebetween, wherein the first housing is connected to the second housing using at least one folding bridge, wherein the folding bridge has a first hinge part arranged at the first housing, and wherein the folding bridge has a second hinge part arranged at the second housing, the method comprising:
- detecting a movement of the optical system using at least one rotational-angle detector;
- determining a folding angle of the first hinge part with respect to the second hinge part;
- determining a correction angle on the basis of the folding angle; and
- rotating the first image stabilizing unit about the correction angle relative to the first housing and/or rotating the second image stabilizing unit about the correction angle relative to the second housing.

2. The method according to claim 1, wherein the at least one rotational-angle detector has a first measurement axis and a second measurement axis arranged perpendicular to the first measurement axis, wherein the first measurement axis and the second measurement axis form a first coordinate system, wherein correction coordinates are determined by a processor using the correction angle using a transformation of rotational coordinates, based on the first coordinate system and measured by the rotational-angle detector, and wherein the correction coordinates are based on a second coordinate system, which is provided by a third axis of rotation and a fourth axis of rotation of the second image stabilizing unit.

3. The method according to claim 2, wherein the correction coordinates are determined as follows:

$$b_x = a_x \cdot \cos(\alpha_k) + a_y \cdot \sin(\alpha_k), \quad \text{Equation 1}$$

$$b_y = a_x \cdot \sin(\alpha_k) - a_y \cdot \cos(\alpha_k), \quad \text{Equation 2}$$

wherein:
- $a_x$ is a signal of the rotational-angle detector in respect of the first measurement axis,
- $a_y$ is a signal of the rotational-angle detector in respect of the second measurement axis,
- $b_x$ is a first transformed signal for a rotation in respect of the third axis of rotation,
- $b_y$ is a second transformed signal for a rotation in respect of the second axis of rotation, and
- $\alpha_k$ is the folding angle.

4. The method according to claim 1, further comprising one of the following steps:
(i) the movement of the optical system is determined by n rotational-angle detectors, wherein n is a natural number; or
(ii) the movement of the optical system is determined by n rotational-angle detectors, wherein n is a natural number, and wherein each of the n rotational-angle detectors is arranged in the first housing.

5. The method according to claim 4, wherein the movement of the optical system is determined by a processor that determines a rotation with respect to respectively the first measurement axis and with respect to respectively the second measurement axis of each of the n rotational-angle detectors, and wherein a first mean value of the rotation about the first measurement axes and a second mean value of the rotation about the second measurement axes are determined by the processor.

6. The method according to claim 1, further comprising at least one of the following steps:

(i) processing using a processor a measurement signal from the rotational-angle detector using a low-pass filter; or
(ii) processing using the processor a measurement signal from the rotational-angle detector using a high-pass filter.

7. The method according to claim 4, further comprising at least one of the following steps:
(i) processing using a processor a measurement signal from each of the n rotational-angle detectors using a low-pass filter; or
(ii) processing using the processor a measurement signal from each of the n rotational-angle detectors using a high-pass filter.

8. The method according to claim 1, wherein the correction angle corresponds to a sum of the folding angle and an offset angle that compensates for at least one of: axes of rotation of the first and second image stabilizing units not being arranged perpendicular to an optical axis and errors that occur when mounting the first and second image stabilizing units in respective housings thereof.

9. An optical system for imaging an object, comprising:
- at least one first housing having at least one first objective and a first eyepiece and at least one first rotational-angle detector for measuring a movement of the optical system;
- at least one second housing having at least one second objective and a second eyepiece, wherein the at least one first housing is connected to the at least one second housing using at least one folding bridge, wherein the at least one folding bridge has a first hinge part arranged at the at least one first housing, wherein the folding bridge has a second hinge part arranged at the at least one second housing;
- at least one first image stabilizing unit disposed in the at least one first housing between the first objective and the first eyepiece, wherein the at least one first image stabilizing unit is one of: a prism erecting system and a lens erecting system;
- at least one second image stabilizing unit disposed in the at least one second housing between the second objective and the second eyepiece, wherein the at least one second image stabilizing unit is one of: a prism erecting system and a lens erecting system;
- at least one folding-bridge sensor for measuring a relative angle between the first hinge part and the second hinge part, the at least one folding-bridge sensor being arranged at the at least one folding bridge; and
- at least one first control unit, wherein the at least one first control unit is connected to the at least one first image stabilizing unit for determining a correction angle based on the relative angle and controlling a movement of the first image stabilizing unit on the basis of the correction angle and/or the at least one first control unit is connected to the second image stabilizing unit for controlling a movement of the second image stabilizing unit on the basis of the correction angle.

10. The optical system according to claim 9, wherein the at least one first housing has at least one second rotational-angle detector for measuring the movement of the optical system.

11. The optical system according to claim 9, wherein the at least one first control unit is designed for moving the at least one first image stabilizing unit, the optical system further comprising:
- at least one second control unit, the at least one second control unit being connected to the at least one second image stabilizing unit for controlling the movement of the at least one second image stabilizing unit.

12. The optical system according to claim 9, further comprising at least one of the following features:
(i) at least one low-pass filter for filtering at least one first detector signal in respect of the movement of the optical system; or
(ii) at least one high-pass filter for filtering at least one second detector signal in respect of the movement of the optical system.

13. A method for setting one or more positions of one or more image stabilizing units of an optical system, wherein a first image stabilizing unit is arranged in a first housing together with at least one first rotational-angle detector, wherein a second image stabilizing unit is arranged in a second housing together with at least one second rotational-angle detector, wherein the first housing is connected to the second housing using at least one folding bridge, wherein the folding bridge has a first hinge part arranged at the first housing and a second hinge part arranged at the second housing, wherein the first image stabilizing unit is one of: a prism erecting system and a lens erecting system and wherein the second image stabilizing unit is one of: a prism erecting system and a lens erecting system, the method comprising:
detecting a movement of the optical system using the at least one first rotational-angle detector and generating a first detector signal, which is based on a first measurement coordinate system of the at least one first rotational-angle detector;
detecting the movement of the optical system using the at least one second rotational-angle detector and generating a second detector signal, which is based on a second measurement coordinate system of the at least one second rotational-angle detector, wherein a relative position of the rotational-angle detectors is taken into account;
using a processor to perform a coordinate transformation of the first detector signal into a third detector signal, which is based on the second measurement coordinate system of the at least one second rotational-angle detector;
using the processor to perform a coordinate transformation of the second detector signal into a fourth detector signal, which is based on the first measurement coordinate system of the at least one first rotational-angle detector;
using the processor to calculate a first mean value from the third detector signal and the second detector signal;
using the processor to calculate a second mean value from the fourth detector signal and the first detector signal;
moving the first image stabilizing unit on the basis of the second mean value; and
moving the second image stabilizing unit on the basis of the first mean value.

14. The method according to claim 13, wherein the first detector signal is transformed into the third detector signal by:

$$b_x = a_x \cdot \gamma_1 + a_y \cdot \gamma_2, \qquad \text{Equation 3}$$

$$b_y = a_x \cdot \gamma_3 + a_y \cdot \gamma_4, \qquad \text{Equation 4}$$

wherein
$a_x$ is a first partial signal of the movement of the optical system relative to a first measurement axis of the first measurement coordinate system;
$a_y$ is a second partial signal of the movement of the optical system relative to a second measurement axis of the first measurement coordinate system;
$b_x$ is a first transformed partial signal of the first partial signal;
$b_y$ is a second transformed partial signal of the second partial signal;
$\gamma_1$ is a first predeterminable transformation factor;
$\gamma_2$ is a second predeterminable transformation factor;
$\gamma_3$ is a third predeterminable transformation factor; and
$\gamma_4$ is a fourth predeterminable transformation factor;
and wherein the second detector signal is transformed into the fourth detector signal by:

$$a'_x = b'_x \cdot \gamma'_1 + b'_y \cdot \gamma'_2, \qquad \text{Equation 5}$$

$$a'_y = b'_x \cdot \gamma'_3 + b'_y \cdot \gamma'_4, \qquad \text{Equation 6}$$

wherein
$b'_x$ is a third partial signal of the movement of the optical system relative to a third measurement axis of the second measurement coordinate system;
$b'_y$ is a fourth partial signal of the movement of the optical system relative to a fourth measurement axis of the second measurement coordinate system;
$a'_x$ is a third transformed partial signal of the third partial signal;
$a'_y$ is a fourth transformed partial signal of the fourth partial signal;
$\gamma'_1$ is a first predeterminable inverse transformation factor;
$\gamma'_2$ is a second predeterminable inverse transformation factor;
$\gamma'_3$ is a third predeterminable inverse transformation factor; and
$\gamma'_4$ is a fourth predeterminable inverse transformation factor.

15. The method according to claim 14, wherein at least one of the following is provided:
(i) the first mean value is calculated by:

$$x_2 = \frac{(b'_x + b_x)}{2} \qquad \text{Equation 7}$$

$$y_2 = \frac{(b'_y + b_y)}{2} \qquad \text{Equation 8}$$

wherein $x_2$ is a first rotational coordinate about the third axis of the second measurement coordinate system and wherein $y_2$ is a second rotational coordinate about the fourth axis of the second measurement coordinate system, or
(ii) the second mean value is calculated by:

$$x_1 = \frac{(a'_x + a_x)}{2} \qquad \text{Equation 9}$$

$$y_1 = \frac{(a'_y + a_y)}{2} \qquad \text{Equation 10}$$

wherein $x_1$ is a first rotational coordinate about the first axis of the first measurement coordinate system and wherein $y_1$ is a second rotational coordinate about the second axis of the first measurement coordinate system.

16. The method according to claim 14, further comprising at least one of the following:
(i) establishing the first predeterminable transformation factor $\gamma_1$ by $$\gamma_1 = \frac{(a_y \cdot b_y + a_x \cdot b_x)}{(a_x)^2 + (a_y)^2}; \quad \text{Equation 11}$$

(ii) establishing the second predeterminable transformation factor $\gamma_2$ by $$\gamma_2 = \frac{(a_y \cdot b_x - a_x \cdot b_y)}{(a_x)^2 + (a_y)^2}; \quad \text{Equation 12}$$

(iii) establishing the third predeterminable transformation factor $\gamma_3$ by $$\gamma_3 = \frac{(a_x \cdot b_y - a_y \cdot b_x)}{(a_x)^2 + (a_y)^2}; \quad \text{Equation 13}$$

(iv) establishing the fourth predeterminable transformation factor $\gamma_4$ by $$\gamma_4 = \frac{(a_x \cdot b_x + a_y \cdot b_y)}{(a_x)^2 + (a_y)^2}; \quad \text{Equation 14}$$

(v) establishing the first predeterminable inverse transformation factor $\gamma'_1$ by $$\gamma'_1 = \frac{(a'_y \cdot b'_y + a'_x \cdot b'_x)}{(a'_x)^2 + (a'_y)^2}; \quad \text{Equation 15}$$

(vi) establishing the second predeterminable inverse transformation factor $\gamma'_2$ by $$\gamma'_2 = \frac{(a'_x \cdot b'_y - a'_y \cdot b'_x)}{(a'_x)^2 + (a'_y)^2}; \quad \text{Equation 16}$$

(vii) establishing the third predeterminable inverse transformation factor $\gamma'_3$ by $$\gamma'_3 = \frac{(a'_y \cdot b'_x - a'_x \cdot b'_y)}{(a'_x)^2 + (a'_y)^2}; \quad \text{Equation 17}$$

or
(viii) establishing the fourth predeterminable inverse transformation factor $\gamma'_4$ by $$\gamma'_4 = \frac{(a'_x \cdot b'_x + a'_y \cdot b'_y)}{(a'_x)^2 + (a'_y)^2}. \quad \text{Equation 18}$$

17. The method according to claim 15, wherein at least one of the following equations applies to the method:

$\gamma_2 = -\gamma_3$ \hfill Equation 19

$\gamma'_2 = -\gamma_3$ \hfill Equation 20

$\gamma'_1 = \gamma_1$ \hfill Equation 21

$\gamma'_4 = \gamma_4$ \hfill Equation 22

$\gamma_2 = -\sin(\arccos(\gamma_1))$ \hfill Equation 23

$\gamma_1 = \cos(\arcsin(\gamma_2))$ \hfill Equation 24

$\gamma'_2 = \sin(\arccos(\gamma'_1))$ \hfill Equation 25

$\gamma'_1 = \cos(\arcsin(\gamma'_2))$. \hfill Equation 26

18. The method according to claim 13, further comprising at least one of the following steps:
(i) processing the first detector signal using a first low-pass filter and generating a first filtered detector signal;
(ii) processing the first detector signal using a first low-pass filter, which has a cutoff frequency of 1 Hz, and generating a first filtered detector signal;
(iii) processing the second detector signal using a second low-pass filter and generating a second filtered detector signal; or
(iv) processing the second detector signal using a second low-pass filter, which has a cutoff frequency of 1 Hz, and generating a second filtered detector signal.

19. The method according to claim 14, further comprising at least one of the following steps:
(i) establishing the first predeterminable transformation factor $\gamma_1$ by $$\gamma_1 = \frac{(\langle a_y \rangle \cdot \langle b_y \rangle + \langle a_x \rangle \cdot \langle b_x \rangle)}{(\langle a_x \rangle)^2 + (\langle a_y \rangle)^2}; \quad \text{Equation 27}$$

(ii) establishing the second predeterminable transformation factor $\gamma_2$ by $$\gamma_2 = \frac{(\langle a_y \rangle \cdot \langle b_x \rangle - \langle a_x \rangle \cdot \langle b_y \rangle)}{(\langle a_x \rangle)^2 + (\langle a_y \rangle)^2}; \quad \text{Equation 28}$$

(iii) establishing the third predeterminable transformation factor $\gamma_3$ by $$\gamma_3 = \frac{(\langle a_x \rangle \cdot \langle b_y \rangle - \langle a_y \rangle \cdot \langle b_x \rangle)}{(\langle a_x \rangle)^2 + (\langle a_y \rangle)^2}; \quad \text{Equation 29}$$

(iv) establishing the fourth predeterminable transformation factor $\gamma_4$ by $$\gamma_4 = \frac{(\langle a_x \rangle \cdot \langle b_x \rangle + \langle a_y \rangle \cdot \langle b_y \rangle)}{(\langle a_x \rangle)^2 + (\langle a_y \rangle)^2}; \quad \text{Equation 30}$$

(v) establishing the first predeterminable inverse transformation factor $\gamma'_1$ by $$\gamma'_1 = \frac{(\langle a'_y \rangle \cdot \langle b'_y \rangle + \langle a'_x \rangle \cdot \langle b'_x \rangle)}{(\langle a'_x \rangle)^2 + (\langle a'_y \rangle)^2}; \quad \text{Equation 31}$$

(vi) establishing the second predeterminable inverse transformation factor $\gamma'_2$ by $$\gamma'_2 = \frac{(\langle a'_x \rangle \cdot \langle b'_y \rangle - \langle a'_y \rangle \cdot \langle b'_x \rangle)}{(\langle a'_x \rangle)^2 + (\langle a'_y \rangle)^2}; \qquad \text{Equation 32}$$

(vii) establishing the third predeterminable inverse transformation factor $\gamma'_3$ by $$\gamma'_3 = \frac{(\langle a'_y \rangle \cdot \langle b'_x \rangle - \langle a'_x \rangle \cdot \langle b'_y \rangle)}{(\langle a'_x \rangle)^2 + (\langle a'_y \rangle)^2}; \qquad \text{Equation 33}$$

or
(viii) establishing the fourth predeterminable inverse transformation factor $\gamma'_4$ by $$\gamma'_4 = \frac{(\langle a'_x \rangle \cdot \langle b'_x \rangle + \langle a'_y \rangle \cdot \langle b'_y \rangle)}{(\langle a'_x \rangle)^2 + (\langle a'_y \rangle)^2}, \qquad \text{Equation 34}$$

wherein
$\langle a_x \rangle$ is a first filtered partial signal of the movement of the optical system relative to a first measurement axis of the first measurement coordinate system,
$\langle a_y \rangle$ is a second filtered partial signal of the movement of the optical system relative to a second measurement axis of the first measurement coordinate system,
$\langle b_x \rangle$ is a first filtered transformed partial signal of the first partial signal,
$\langle b_y \rangle$ is a second filtered transformed partial signal of the second partial signal,
$\langle b'_x \rangle$ is a third filtered partial signal of the movement of the optical system relative to a third measurement axis of the second measurement coordinate system,
$\langle b'_y \rangle$ is a fourth filtered partial signal of the movement of the optical system relative to a fourth measurement axis of the second measurement coordinate system,
$\langle a'_x \rangle$ is a third filtered transformed partial signal of the third partial signal, and
$\langle a'_y \rangle$ is a fourth filtered transformed partial signal of the fourth partial signal.

20. The method according to claim 14, further comprising at least one of the following steps:
(i) processing at least one of the predeterminable transformation factors or predeterminable inverse transformation factors using a high-pass filter and generating a high-pass filter signal; or
(ii) processing at least one of the predeterminable transformation factors or predeterminable inverse transformation factors using a high-pass filter (27, 28), which has a cutoff frequency of 0.2 Hz, and generating a high-pass filter signal.

21. A method for setting one or more positions of one or more image stabilizing units of an optical system, wherein a first image stabilizing unit is arranged in a first housing together with at least one first rotational-angle detector, wherein a second image stabilizing unit is arranged in a second housing together with at least one second rotational-angle detector, wherein the first housing is connected to the second housing using at least one folding bridge, wherein the folding bridge has a first hinge part arranged at the first housing and a second hinge part arranged at the second housing, the method comprising:
detecting a movement of the optical system using the at least one first rotational-angle detector and generating a first detector signal, which is based on a first measurement coordinate system of the at least one first rotational-angle detector;
detecting the movement of the optical system using the at least one second rotational-angle detector and generating a second detector signal, which is based on a second measurement coordinate system of the at least one second rotational-angle detector;
using a processor to transform the first detector signal into a third detector signal, which is based on the second measurement coordinate system of the at least one second rotational-angle detector;
using the processor to transform the second detector signal into a fourth detector signal, which is based on the first measurement coordinate system of the at least one first rotational-angle detector;
using the processor to calculate a first mean value from the third detector signal and the second detector signal;
using the processor to calculate a second mean value from the fourth detector signal and the first detector signal;
moving the first image stabilizing unit on the basis of the second mean value; and
moving the second image stabilizing unit on the basis of the first mean value, wherein the first detector signal is transformed into the third detector signal by:

$$b_x = a_x \cdot \gamma_1 + a_y \cdot \gamma_2, \qquad \text{Equation 3}$$

$$b_y = a_x \cdot \gamma_3 + a_y \cdot \gamma_4, \qquad \text{Equation 4}$$

wherein
$a_x$ is a first partial signal of the movement of the optical system relative to a first measurement axis of the first measurement coordinate system;
$a_y$ is a second partial signal of the movement of the optical system relative to a second measurement axis of the first measurement coordinate system;
$b_x$ is a first transformed partial signal of the first partial signal;
$b_y$ is a second transformed partial signal of the second partial signal;
$\gamma_1$ is a first predeterminable transformation factor;
$\gamma_2$ is a second predeterminable transformation factor;
$\gamma_3$ is a third predeterminable transformation factor; and
$\gamma_4$ is a fourth predeterminable transformation factor;
and wherein the second detector signal is transformed into the fourth detector signal by:

$$a'_x = b'_x \cdot \gamma'_1 + b'_y \cdot \gamma'_2, \qquad \text{Equation 5}$$

$$a'_y = b'_x \cdot \gamma'_3 + b'_y \cdot \gamma'_4, \qquad \text{Equation 6}$$

wherein
$b'_x$ is a third partial signal of the movement of the optical system relative to a third measurement axis of the second measurement coordinate system;
$b'_y$ is a fourth partial signal of the movement of the optical system relative to a fourth measurement axis of the second measurement coordinate system;
$a'_x$ is a third transformed partial signal of the third partial signal;
$a'_y$ is a fourth transformed partial signal of the fourth partial signal;
$\gamma'_1$ is a first predeterminable inverse transformation factor;
$\gamma'_2$ is a second predeterminable inverse transformation factor;
$\gamma'_3$ is a third predeterminable inverse transformation factor; and $\gamma'_4$ a is a fourth predeterminable inverse transformation factor
  (i) processing at least one of the predeterminable transformation factors or predeterminable inverse transformation factors using a high-pass filter and generating a high-pass filter signal; or
  (ii) processing at least one of the predeterminable transformation factors or predeterminable inverse transformation factors using a high-pass filter (27, 28), which has a cutoff frequency of 0.2 Hz, and generating a high-pass filter signal, wherein processing at least one of the predeterminable transformation factors or predeterminable inverse transformation factors comprises a step of processing a sum of at least two of the predeterminable transformation factors or at least two of the predeterminable inverse transformation factors.

22. An optical system for imaging an object, comprising
at least one first housing having at least one first objective and at least one first rotational-angle detector for measuring a movement of the optical system;
at least one second housing having at least one second objective and at least one second rotational-angle detector for measuring a movement of the optical system, wherein the at least one first housing is connected to the at least one second housing using at least one folding bridge, wherein the at least one folding bridge has a first hinge part arranged at the first housing, and wherein the at least one folding bridge has a second hinge part arranged at the second housing;
at least one first image stabilizing unit disposed in the at least one first housing, wherein the first image stabilizing unit is one of: a prism erecting system and a lens erecting system;
at least one second image stabilizing unit disposed in the at least one second housing, wherein the second image stabilizing unit is one of: a prism erecting system and a lens erecting system;
at least one control unit, said at least one control unit being connected to the at least one first image stabilizing unit for controlling a movement of the first image stabilizing unit and/or the at least one control unit being connected to the second image stabilizing unit for controlling a movement of the at least one second image stabilizing unit, wherein controlling movement includes:
detecting a movement of the optical system using the at least one first rotational-angle detector and generating a first detector signal, which is based on a first measurement coordinate system of the at least one first rotational-angle detector;
detecting the movement of the optical system using the at least one second rotational-angle detector and generating a second detector signal, which is based on a second measurement coordinate system of the at least one second rotational-angle detector, wherein a relative position of the rotational-angle detectors is taken into account;
using a processor to perform a coordinate transformation of the first detector signal into a third detector signal, which is based on the second measurement coordinate system of the at least one second rotational-angle detector;
using the processor to perform a coordinate transformation of the second detector signal into a fourth detector signal, which is based on the first measurement coordinate system of the at least one first rotational-angle detector;
using the processor to calculate a first mean value from the third detector signal and the second detector signal;
using the processor to calculate a second mean value from the fourth detector signal and the first detector signal;
moving the first image stabilizing unit on the basis of the second mean value; and
moving the second image stabilizing unit on the basis of the first mean value.

23. The optical system according to claim 22, further comprising at least one of the following features:
  (i) at least one low-pass filter; or
  (ii) at least one high-pass filter.

* * * * *